US009154841B2

(12) United States Patent
Sinha et al.

(10) Patent No.: US 9,154,841 B2
(45) Date of Patent: Oct. 6, 2015

(54) METHOD AND SYSTEM FOR DETECTING AND RESOLVING CONFLICTS IN AN AUTOMATIC CONTENT RECOGNITION BASED SYSTEM

(71) Applicant: Turner Broadcasting System, Inc., Atlanta, GA (US)

(72) Inventors: Nishith Kumar Sinha, Mableton, GA (US); Matthew Paul Giles, Marietta, GA (US); Donald Jude Loheide, Mableton, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 14/142,041

(22) Filed: Dec. 27, 2013

(65) Prior Publication Data
US 2014/0282670 A1 Sep. 18, 2014

Related U.S. Application Data

(60) Provisional application No. 61/798,439, filed on Mar. 15, 2013.

(51) Int. Cl.
*H04H 60/32* (2008.01)
*G06F 3/048* (2013.01)
(Continued)

(52) U.S. Cl.
CPC ......... *H04N 21/47205* (2013.01); *H04H 20/93* (2013.01); *H04H 60/37* (2013.01); *H04H 60/40* (2013.01); *H04H 60/82* (2013.01); *H04N 21/23418* (2013.01); *H04N 21/2407* (2013.01); *H04N 21/4122* (2013.01); *H04N 21/435* (2013.01); *H04N 21/442* (2013.01); *H04N 21/44008* (2013.01); *H04N 21/6125* (2013.01); *H04N 21/6175* (2013.01); *H04N 21/64322* (2013.01)

(58) Field of Classification Search
USPC .......................................................... 725/19
See application file for complete search history.

(56) References Cited

U.S. PATENT DOCUMENTS 5,305,464 A * 4/1994 Frett ............................... 725/15
5,410,326 A 4/1995 Goldstein (Continued)

FOREIGN PATENT DOCUMENTS

WO WO 95/17746 A1 6/1995
WO WO 02/37316 A2 5/2002
WO WO 03/067459 A1 8/2003

*Primary Examiner* — Nathan Flynn
*Assistant Examiner* — William J Kim
(74) *Attorney, Agent, or Firm* — Loza & Loza, LLP; Hopeton S. Walker

(57) ABSTRACT

A device that handles operations for automatic content recognition detects utilizing the automatic content recognition (ACR) operations, a conflict when a first overlay and a second overlay are concurrently presented on a channel on the device. The device may modify the presentation of the first overlay and/or the second overlay for the channel based on the detection. The device utilizes the ACR operations to determine an identity of the channel based on a unique identifier such as a channel logo. The device utilizes the ACR operations to determine a location where the first overlay and/or the second overlay is presented based on the channel identity and may relocate the first overlay and/or the second overlay from the determined location to a new location. If the conflict is detected, the device may be resize, defer or cancel presentation of one of the first overlay and/or the second overlay for the channel.

20 Claims, 17 Drawing Sheets

(51) Int. Cl.

| | | |
|---|---|---|
| *H04N 21/472* | (2011.01) | |
| *H04H 60/40* | (2008.01) | |
| *H04N 21/234* | (2011.01) | |
| *H04N 21/24* | (2011.01) | |
| *H04N 21/44* | (2011.01) | |
| *H04N 21/61* | (2011.01) | |
| *H04N 21/442* | (2011.01) | |
| *H04N 21/643* | (2011.01) | |
| *H04H 60/37* | (2008.01) | |
| *H04N 21/41* | (2011.01) | |
| *H04N 21/435* | (2011.01) | |
| *H04H 20/93* | (2008.01) | |
| *H04H 60/82* | (2008.01) | |

(56) References Cited

U.S. PATENT DOCUMENTS

| | | |
|---|---|---|
| 5,437,050 A | 7/1995 | Lamb et al. |
| 5,712,995 A * | 1/1998 | Cohn ............... 715/792 |
| 5,874,686 A | 2/1999 | Ghias et al. |
| 5,918,223 A | 6/1999 | Blum et al. |
| 5,956,683 A | 9/1999 | Jacobs et al. |
| 5,991,737 A | 11/1999 | Chen |
| 6,121,530 A | 9/2000 | Sonoda |
| 6,184,877 B1 | 2/2001 | Dodson et al. |
| 6,201,176 B1 | 3/2001 | Yourlo |
| 6,314,577 B1 | 11/2001 | Pocock |
| 6,408,272 B1 | 6/2002 | White et al. |
| 6,504,089 B1 | 1/2003 | Negishi et al. |
| 6,556,218 B1 | 4/2003 | Alcorn |
| 6,760,720 B1 | 7/2004 | De Bellis |
| 6,765,595 B2 | 7/2004 | Lee et al. |
| 6,834,308 B1 | 12/2004 | Ikezoye et al. |
| 6,968,337 B2 | 11/2005 | Wold |
| 6,990,453 B2 | 1/2006 | Wang et al. |
| 7,080,325 B2 | 7/2006 | Treibach-Heck et al. |
| 7,095,871 B2 | 8/2006 | Jones et al. |
| 7,134,132 B1 | 11/2006 | Ngo et al. |
| 7,174,293 B2 | 2/2007 | Kenyon et al. |
| 7,190,971 B1 | 3/2007 | Kawamoto |
| 7,194,752 B1 | 3/2007 | Kenyon et al. |
| 7,266,343 B1 | 9/2007 | Yli-juuti et al. |
| 7,363,278 B2 | 4/2008 | Schmelzer et al. |
| 7,444,353 B1 | 10/2008 | Chen et al. |
| 7,500,007 B2 | 3/2009 | Ikezoye et al. |
| 7,529,659 B2 | 5/2009 | Wold |
| 7,562,012 B1 | 7/2009 | Wold et al. |
| 7,562,392 B1 | 7/2009 | Rhoads et al. |
| 7,565,327 B2 | 7/2009 | Schmelzer |
| 7,624,416 B1 | 11/2009 | Vandermolen et al. |
| 7,703,114 B2 | 4/2010 | Thukral |
| 7,707,088 B2 | 4/2010 | Schmelzer |
| 7,711,652 B2 | 5/2010 | Schmelzer |
| 7,730,509 B2 | 6/2010 | Boulet et al. |
| 7,747,749 B1 | 6/2010 | Erikson et al. |
| 7,783,489 B2 | 8/2010 | Kenyon et al. |
| 7,797,249 B2 | 9/2010 | Schmelzer et al. |
| 7,813,954 B1 | 10/2010 | Price et al. |
| 7,870,574 B2 | 1/2011 | Kenyon et al. |
| 7,877,290 B1 * | 1/2011 | Arsenault et al. ............ 705/14.4 |
| 7,877,438 B2 | 1/2011 | Schrempp et al. |
| 7,900,228 B2 | 3/2011 | Stark et al. |
| 7,917,645 B2 | 3/2011 | Ikezoye et al. |
| 8,006,274 B2 | 8/2011 | Scott, III |
| 8,046,803 B1 | 10/2011 | Lee |
| 8,117,635 B2 | 2/2012 | Hendricks et al. |
| 8,249,422 B2 | 8/2012 | Narahara et al. |
| 8,281,339 B1 * | 10/2012 | Walker et al. ............ 725/45 |
| 8,335,833 B1 | 12/2012 | Parkinson |
| 8,407,750 B2 | 3/2013 | Vorbau |
| 8,413,206 B1 | 4/2013 | Wyatt et al. |
| 8,553,148 B2 | 10/2013 | Ramaswamy et al. |
| 8,572,650 B2 | 10/2013 | Townsend et al. |
| 8,732,473 B2 | 5/2014 | Bisso et al. |
| 8,732,739 B2 | 5/2014 | Sillerman |
| 8,793,274 B2 | 7/2014 | Yu et al. |
| 2002/0032906 A1 | 3/2002 | Grossman |
| 2002/0069100 A1 | 6/2002 | Arberman |
| 2002/0073419 A1 | 6/2002 | Yen et al. |
| 2002/0078441 A1 | 6/2002 | Drake et al. |
| 2002/0083060 A1 | 6/2002 | Wang et al. |
| 2002/0120925 A1 | 8/2002 | Logan |
| 2002/0133817 A1 | 9/2002 | Markel |
| 2002/0178447 A1 | 11/2002 | Plotnick et al. |
| 2003/0002638 A1 | 1/2003 | Kaars |
| 2003/0035075 A1 | 2/2003 | Butler et al. |
| 2003/0055699 A1 | 3/2003 | O'Connor |
| 2003/0056101 A1 | 3/2003 | Epstein |
| 2003/0101451 A1 | 5/2003 | Bentolila et al. |
| 2003/0149975 A1 | 8/2003 | Eldering et al. |
| 2003/0154475 A1 | 8/2003 | Rodriguez et al. |
| 2003/0172381 A1 | 9/2003 | Janevski |
| 2004/0003397 A1 | 1/2004 | Boston et al. |
| 2004/0031046 A1 | 2/2004 | Weinblatt et al. |
| 2004/0034874 A1 | 2/2004 | Hord et al. |
| 2004/0068737 A1 | 4/2004 | Itoh et al. |
| 2004/0143349 A1 | 7/2004 | Roberts et al. |
| 2004/0143845 A1 | 7/2004 | Lin et al. |
| 2004/0189710 A1 * | 9/2004 | Goulden et al. ............ 345/790 |
| 2004/0205810 A1 | 10/2004 | Matheny et al. |
| 2004/0210847 A1 * | 10/2004 | Berson et al. ............ 715/788 |
| 2004/0255322 A1 | 12/2004 | Meadows et al. |
| 2005/0022211 A1 | 1/2005 | Veselov et al. |
| 2005/0097599 A1 | 5/2005 | Plotnick et al. |
| 2005/0149968 A1 * | 7/2005 | Konig et al. ............ 725/32 |
| 2005/0235307 A1 | 10/2005 | Relan et al. |
| 2005/0278731 A1 | 12/2005 | Cameron et al. |
| 2006/0015923 A1 | 1/2006 | Chuah et al. |
| 2006/0026636 A1 | 2/2006 | Stark et al. |
| 2006/0031684 A1 | 2/2006 | Sharma et al. |
| 2006/0181641 A1 * | 8/2006 | Ko ............ 348/445 |
| 2006/0187358 A1 | 8/2006 | Lienhart et al. |
| 2006/0195860 A1 | 8/2006 | Eldering et al. |
| 2006/0282847 A1 | 12/2006 | Gupte |
| 2007/0192784 A1 | 8/2007 | Postrel |
| 2007/0211174 A1 * | 9/2007 | Putterman et al. ............ 348/588 |
| 2007/0250901 A1 | 10/2007 | McIntire et al. |
| 2008/0064490 A1 | 3/2008 | Ellis |
| 2008/0104634 A1 | 5/2008 | Gajdos et al. |
| 2008/0127253 A1 * | 5/2008 | Zhang et al. ............ 725/35 |
| 2008/0227436 A1 | 9/2008 | Gantman et al. |
| 2008/0244640 A1 | 10/2008 | Belleguie |
| 2008/0250447 A1 | 10/2008 | Rowe et al. |
| 2008/0305815 A1 | 12/2008 | McDonough |
| 2008/0310731 A1 | 12/2008 | Stojancic et al. |
| 2008/0313140 A1 | 12/2008 | Pereira et al. |
| 2009/0009532 A1 * | 1/2009 | Hallberg ............ 345/636 |
| 2009/0064261 A1 | 3/2009 | Jung |
| 2009/0077046 A1 | 3/2009 | Narahara et al. |
| 2009/0077489 A1 * | 3/2009 | Homma ............ 715/788 |
| 2009/0094637 A1 | 4/2009 | Lemmons |
| 2009/0106104 A1 | 4/2009 | Upendran et al. |
| 2009/0119723 A1 | 5/2009 | Tinsman |
| 2009/0133049 A1 | 5/2009 | Bradley |
| 2009/0150930 A1 | 6/2009 | Sherwin et al. |
| 2009/0205000 A1 * | 8/2009 | Christensen et al. ............ 725/61 |
| 2009/0235317 A1 | 9/2009 | Igarashi |
| 2009/0259690 A1 | 10/2009 | Bogdanov |
| 2009/0288113 A1 * | 11/2009 | Skinner ............ 725/32 |
| 2009/0317053 A1 | 12/2009 | Morley et al. |
| 2009/0318114 A1 | 12/2009 | Bertoni |
| 2009/0319522 A1 | 12/2009 | Karstens |
| 2009/0327894 A1 | 12/2009 | Rakib et al. |
| 2010/0007797 A1 | 1/2010 | Stojancic |
| 2010/0026721 A1 * | 2/2010 | Park et al. ............ 345/660 |
| 2010/0043040 A1 | 2/2010 | Olsen, Jr. |
| 2010/0095337 A1 | 4/2010 | Dua |
| 2010/0121691 A1 | 5/2010 | Shifflett et al. |
| 2010/0125498 A1 | 5/2010 | Jaramillo |
| 2010/0158391 A1 | 6/2010 | Cunningham et al. |
| 2010/0162344 A1 | 6/2010 | Casagrande et al. |
| 2010/0169906 A1 | 7/2010 | Takahashi |
| 2010/0175078 A1 | 7/2010 | Knudson et al. |

(56) References Cited

U.S. PATENT DOCUMENTS

| | | |
|---|---|---|
| 2010/0205627 A1 | 8/2010 | Cesmedziev |
| 2010/0205628 A1 | 8/2010 | Davis et al. |
| 2010/0242065 A1 | 9/2010 | Murakami |
| 2010/0245681 A1 | 9/2010 | Harris |
| 2010/0269128 A1 | 10/2010 | Gordon |
| 2010/0303338 A1 | 12/2010 | Stojancic et al. |
| 2010/0306193 A1 | 12/2010 | Pereira et al. |
| 2010/0318515 A1 | 12/2010 | Ramanathan et al. |
| 2010/0325135 A1 | 12/2010 | Chen et al. |
| 2011/0067046 A1 | 3/2011 | Cox et al. |
| 2011/0067066 A1 | 3/2011 | Barton et al. |
| 2011/0078729 A1 | 3/2011 | Lajoie et al. |
| 2011/0078733 A1* | 3/2011 | Lee .................. 725/39 |
| 2011/0088063 A1 | 4/2011 | Ben-Romdhane et al. |
| 2011/0107363 A1 | 5/2011 | Sanghavi |
| 2011/0122255 A1 | 5/2011 | Haritaoglu |
| 2011/0177775 A1 | 7/2011 | Gupta et al. |
| 2011/0191806 A1 | 8/2011 | Knudson et al. |
| 2011/0219419 A1 | 9/2011 | Reisman |
| 2011/0280434 A1 | 11/2011 | Mamidwar et al. |
| 2011/0283322 A1 | 11/2011 | Hamano |
| 2011/0283327 A1 | 11/2011 | Zhu |
| 2011/0289098 A1 | 11/2011 | Oztaskent et al. |
| 2011/0289114 A1 | 11/2011 | Yu et al. |
| 2011/0289524 A1 | 11/2011 | Toner et al. |
| 2011/0307931 A1 | 12/2011 | Shuster |
| 2011/0311095 A1 | 12/2011 | Archer |
| 2011/0313856 A1 | 12/2011 | Cohen et al. |
| 2011/0314491 A1 | 12/2011 | Delidais et al. |
| 2011/0314495 A1 | 12/2011 | Zenor |
| 2012/0017236 A1 | 1/2012 | Stafford et al. |
| 2012/0042334 A1 | 2/2012 | Choi et al. |
| 2012/0054848 A1 | 3/2012 | Salowey et al. |
| 2012/0079521 A1 | 3/2012 | Garg et al. |
| 2012/0096491 A1 | 4/2012 | Shkedi |
| 2012/0117584 A1 | 5/2012 | Gordon |
| 2012/0124625 A1 | 5/2012 | Foote et al. |
| 2012/0144416 A1 | 6/2012 | Wetzer et al. |
| 2012/0167133 A1 | 6/2012 | Carroll et al. |
| 2012/0174157 A1 | 7/2012 | Stinson, III et al. |
| 2012/0185895 A1 | 7/2012 | Wong et al. |
| 2012/0192227 A1 | 7/2012 | Fleischman et al. |
| 2012/0215789 A1 | 8/2012 | Ramanathan et al. |
| 2012/0246693 A1 | 9/2012 | Iqbal |
| 2012/0299815 A1* | 11/2012 | Kim et al. .................. 345/156 |
| 2012/0303442 A1 | 11/2012 | Patwa et al. |
| 2012/0311618 A1 | 12/2012 | Blaxland |
| 2012/0317240 A1 | 12/2012 | Wang |
| 2012/0331496 A1 | 12/2012 | Copertino et al. |
| 2013/0014146 A1 | 1/2013 | Bhatia et al. |
| 2013/0019262 A1 | 1/2013 | Bhatia et al. |
| 2013/0047178 A1 | 2/2013 | Moon et al. |
| 2013/0047180 A1 | 2/2013 | Moon et al. |
| 2013/0125163 A1 | 5/2013 | Chen et al. |
| 2013/0132999 A1 | 5/2013 | Pandey |
| 2013/0162902 A1 | 6/2013 | Musser, Jr. et al. |
| 2013/0163957 A1 | 6/2013 | Ikizyan et al. |
| 2013/0167171 A1 | 6/2013 | Kitazato et al. |
| 2013/0174191 A1 | 7/2013 | Thompson, Jr. et al. |
| 2013/0198768 A1 | 8/2013 | Kitazato |
| 2013/0205315 A1 | 8/2013 | Sinha et al. |
| 2013/0205316 A1 | 8/2013 | Sinha et al. |
| 2013/0205318 A1 | 8/2013 | Sinha et al. |
| 2013/0205319 A1 | 8/2013 | Sinha et al. |
| 2013/0205335 A1 | 8/2013 | Sinha et al. |
| 2013/0208942 A1 | 8/2013 | Davis |
| 2013/0239163 A1 | 9/2013 | Kim et al. |
| 2013/0305335 A1 | 11/2013 | Syed et al. |
| 2013/0332951 A1 | 12/2013 | Gharaat et al. |
| 2013/0339999 A1 | 12/2013 | Sangiovanni et al. |
| 2014/0082659 A1 | 3/2014 | Fife et al. |
| 2014/0089815 A1 | 3/2014 | Gildfind et al. |
| 2014/0150022 A1 | 5/2014 | Oh et al. |
| 2014/0164994 A1 | 6/2014 | Myslinski |

\* cited by examiner

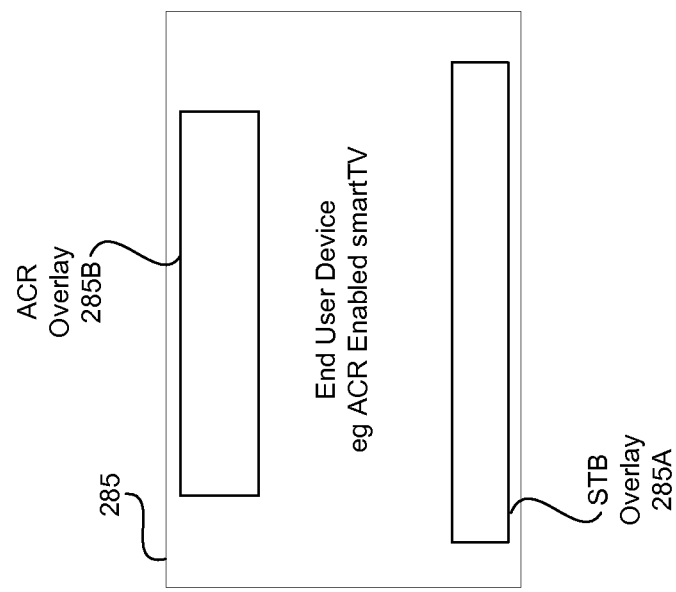

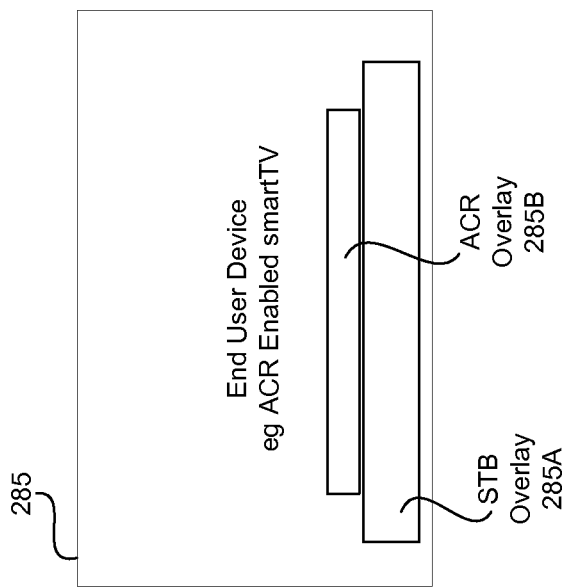

METHOD AND SYSTEM FOR DETECTING AND RESOLVING CONFLICTS IN AN AUTOMATIC CONTENT RECOGNITION BASED SYSTEM

CROSS-REFERENCE TO RELATED APPLICATIONS/INCORPORATION BY REFERENCE

This application makes reference to, claims priority to, and claims the benefit of U.S. Application Ser. No. 61/798,439, which was filed on Mar. 15, 2013.

This application also makes reference to:
U.S. application Ser. No. 14/141,931, which was filed on Dec. 27, 2014;
U.S. application Ser. No. 14/141,972, which was filed on Dec. 27, 2014;
U.S. application Ser. No. 14/141,995, which was filed on Dec. 27, 2014;
U.S. application Ser. No. 14/142,022, which was filed on Dec. 27, 2014
U.S. application Ser. No. 13/730,352, filed Dec. 28, 2012;
U.S. application Ser. No. 13/730,459, filed Dec. 28, 2012;
U.S. application Ser. No. 13/730,495, filed Dec. 28, 2012;
U.S. application Ser. No. 13/730,530, filed Dec. 28, 2012;
U.S. application Ser. No. 13/730,754, filed Dec. 28, 2012;
U.S. application Ser. No. 13/730,559, filed Dec. 28, 2012;
U.S. application Ser. No. 13/730,579, filed Dec. 28, 2012;
U.S. application Ser. No. 13/730,593, filed Dec. 28, 2012;
U.S. application Ser. No. 13/730,759, filed Dec. 28, 2012;
U.S. application Ser. No. 13/730,627, filed Dec. 28, 2012;
U.S. application Ser. No. 13/730,644, filed Dec. 28, 2012;
U.S. application Ser. No. 13/730,656, filed Dec. 28, 2012;
U.S. application Ser. No. 13/730,670, filed Dec. 28, 2012;
U.S. application Ser. No. 13/730,691, filed Dec. 28, 2012;
U.S. application Ser. No. 13/730,702, filed Dec. 28, 2012;
U.S. application Ser. No. 13/730,718, filed Dec. 28, 2012; and
U.S. application Ser. No. 13/730,734, filed Dec. 28, 2012.

Each of the above referenced applications is hereby incorporated herein by reference in its entirety.

FIELD OF TECHNOLOGY

Certain embodiments of the invention relate to digital audio/video content recognition. More specifically, certain embodiments of the invention relate to a method and system for detecting and resolving overlay conflicts in an automatic content recognition based system.

BACKGROUND

Smart or connected televisions (TVs) may receive data from data networks that allow a viewer to not only access broadcast digital content, but to also receive multimedia content.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for detecting and resolving overlay conflicts in an automatic content recognition based system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2D is a diagram that illustrates the positioning or relocation of an ACR overlay to prevent a conflict, in accordance with an embodiment of the invention.

FIG. 2E is a diagram that illustrates the sizing or resizing of an ACR overlay to prevent a conflict, in accordance with an embodiment of the invention.

DETAILED DESCRIPTION OF THE INVENTION

Figure 1:
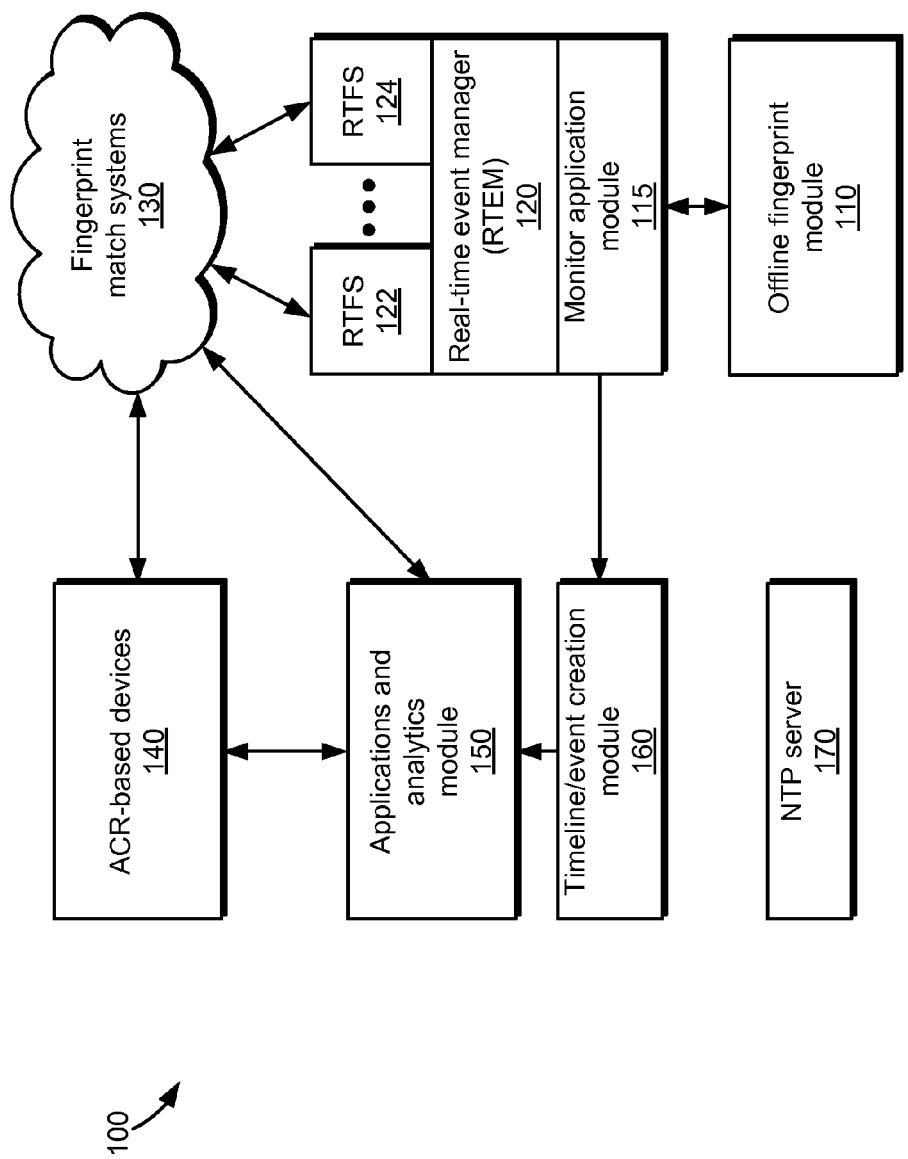
FIG. 1 is a high-level block diagram that illustrates an exemplary automatic content recognition system, which may be utilized for detecting and resolving overlay conflicts, in accordance with an exemplary embodiment of the invention.

Certain embodiments of the invention may be found in a method and system for detecting and resolving overlay conflicts in an automatic content recognition based system. In accordance with various embodiments of the invention, a device that handles operations for automatic content recognition is operable to detect utilizing the automatic content recognition operations, a conflict on a channel with concurrent presentation of a first overlay and a second overlay on the device. The device may be referred to as an ACR-enabled device. The device may modify the presentation of the first overlay and/or the second overlay for the channel based on the detection. The device may utilize the automatic content recognition operations to determine an identity of the channel based on a unique identifier, for example a channel logo, that is associated with the channel and is presented on the channel. The device may utilize the automatic content recognition operations to determine a location where the first overlay and/or the second overlay is presented for the channel based on the determined identity of the channel. In instances where the conflict is detected, the device may utilize the automatic content recognition operations to determine one or more corresponding new locations for presenting the first overlay and/or the second overlay for the channel in order to resolve the conflict. The one or more corresponding new locations may be based upon a region constraint map for a particular channel. The device may relocate the first overlay and/or the second overlay from the determined location where the first overlay and the second overlay is presented to one or more corresponding new locations.

The device may utilize the automatic content recognition operations to determine a corresponding size of the first overlay and/or the second overlay for the channel. If the conflict is detected, the device may be operable to determine a new size of the first overlay and/or the second overlay for the channel in order to resolve the conflict. The device may resize the first overlay and/or the second overlay for the channel based on the determined new size. In one embodiment of the invention, if the conflict is detected, the device may defer presentation of one of the first overlay and/or the second overlay for the channel. In another embodiment of the invention, if the conflict is detected, the device is operable to cancel presentation of one of the first overlay and/or the second overlay for the channel.

Various embodiments of the invention provide a system architecture that implements the ACR abstraction layer based on utilizing a real-time event manager (RTEM) to communicate with a plurality of real-time fingerprint servers (RTFSs). The RTEM may operate as a triggering mechanism that provides events (i.e., event identifier and corresponding data) to the plurality of real-time fingerprint servers (RTFSs), each of which associates the event(s) to the corresponding fingerprints of the broadcast network. Each RTFS may employ a different fingerprinting technology. At least portions of the system architecture can be synchronized using a network/broadcast time server, which is also referred to as a network protocol time (NTP) server. That is, the RTEM and the fingerprinting servers may operate based on a common reference clock provided by the NTP server. Each of the fingerprint servers may generate a set of video fingerprints in real time from a network television feed by utilizing a video fingerprint technology that is different from the technology utilized by any of the other fingerprint servers. The different fingerprinting technologies may be from different fingerprinting vendors, for example. The fingerprint servers may also be referred to as real-time fingerprint servers (RTFSs). A monitor application in the ACR system may be operable to assign one or more interactive event identifiers to the RTEM by associating an NTP broadcast time to a fingerprint that is then propagated to other fingerprint systems (e.g., fingerprint servers) via an application programming interface (API). The fingerprint servers may communicate the sets of video fingerprints and interactive event identifiers to corresponding fingerprint match systems, which in turn may communicate with devices that utilize the same video fingerprint technology as the corresponding fingerprint server.

The assignment of the event identifiers is based on a broadcast NTP time corresponding to each identified event. The event identifiers may provide information about different interactive events that may take place in a connected television such as and ACR-enable smart TV. A connected TV may refer to, for example, a television that has internet access and/or is capable of running applications. The event identifiers may also be referred to as interactive event identifiers (IDs), for example. The event identifiers may be determined in real time from a director's input for live programming, apriori from a predetermined network schedule, or from previously ingested content with interactivity defined (e.g., offline content). When determined from previously ingested content, the interactive event identifiers may be determined using a video fingerprinting process that is separate from those utilized by the fingerprint servers. This process may rely on any of the video fingerprinting technologies utilized by the fingerprint servers or on a different technology altogether The abstraction layer may refer to, for example, the ability of an ACR system to assign the same event identifiers to different sets of video fingerprints that are generated by different video fingerprint technologies. That is, by appropriately timing the assignment of event identifiers to multiple sequences of video fingerprints that are generated from the same video content but with different video fingerprinting technologies, a single ACR system is able to support video fingerprinting technologies from multiple vendors. This approach allows the ACR system to be both flexible and scalable with respect to fingerprint technology vendors.

Fingerprinting, and more particularly ACR fingerprinting, may refer to a process by which features of a video frame or a set thereof, and/or of an audio frame or a set thereof, may be analyzed to create representations (i.e., fingerprints) for each piece of content, for example. The fingerprints may be unique to each piece or sequence of content and may be highly robust against broadcast distortions such as re-encoding, aspect ratio, frame rate, up/down conversion, and pitch correction, to name a few. The fingerprints may be stored in a reference database in the ACR system such that unidentified content (e.g., content from a live network television feed or broadcast) may be identified by comparing fingerprints taken of the unidentified content with the stored fingerprints.

Once the event identifiers have been assigned by the monitor application and communicated to the real-time fingerprint servers via the real-time event manager, the real-time fingerprint servers may communicate the video fingerprints and the assigned event identifiers to corresponding fingerprint match systems. In some instances, the fingerprint match systems may be operated by a third party (e.g., television manufacturers, vendors etc.) as hosted services over the Internet (e.g., cloud computing, etc.). Each of the fingerprint match systems may communicate with devices (e.g., connected TVs, tablets, smartphones, etc.) that utilize the same video fingerprint technology utilized by the fingerprint server that corresponds to that fingerprint match system. These devices may be referred to as viewer or end user devices, for example.

The fingerprint match systems receive video fingerprints from the end-user devices and compare them to the ones received from the real-time fingerprint servers. When a match occurs, the fingerprint match systems may notify the end-user devices that an interactive event is to take place if there is an event identifier that corresponds to the matched video fingerprints.

As described above, automatic content recognition may be utilized across several platforms, including connected TVs from various manufacturers as well as smartphones and tablets. Since television viewing may be rapidly evolving from a single-screen experience to a multiple-screen experience, television networks may need to automatically identify the context of what a viewer is watching and the time in the program, both during a live television broadcast and in subsequent viewings such as when a program is being reproduced by a digital video recorder (DVR). In multi-screen viewing experiences, for example, companion applications on second-screen devices may also be utilized to interact with the television programming by using fingerprint technology that is available in the second-screen device or by pairing the second-screen device with the connected TV.

Having the ability to identify context and program timing may enable a network to increase audience engagement, extend viewing times, and provide program sponsors additional ways to engage with the audience, such as offering viewers personalized advertising offers or creating a second-screen experience during an advertisement break. These features may be implemented by having a central video fingerprint repository and management platform that facilitates triggering interactive events across various platforms regardless of the ACR vendor solution (e.g., fingerprinting technology). For example, an ACR system may utilize a single broadcast ACR solution to support connected TVs from multiple vendors as well as second-screen devices running companion applications.

There may be instances in which the vendors of connected TVs and supporting services are not able to associate an event with a fingerprint. Instead, those vendors may support the association of the content being viewed with a timeline. Accordingly, an ACR system may need to support timeline association in addition to event-to-fingerprint association. For timeline association, for example, the ACR system may be operable to create and provide a timeline that spans the duration of a program or show. The timeline can be distributed to the corresponding connected TVs supported by the vendors through vendor servers. With the timeline available, the connected TV can launch an event when the appropriate point in the timeline is reached.

Below are described various examples of aspects related to an ACR system that utilizes an architecture based on the abstraction layer. These exemplary aspects may comprise the system architecture, processes, APIs, and/or web-based services.

FIG. 1 is a high-level block diagram that illustrates an exemplary automatic content recognition system, which may be utilized for detecting and resolving overlay conflicts, in accordance with an exemplary embodiment of the invention. Referring to FIG. 1, there is shown an ACR system 100 comprising an abstraction layer that is operable to support fingerprinting technology from multiple vendors. The ACR system 100 may be operable to identify a network television station that provides content for display on a viewing screen based on the logo, symbol, sign, watermark, and/or text that are typically utilized to represent the network television station.

The ACR system 100 may comprise an offline fingerprint module 110, a monitor application module 115, a real-time event manager (RTEM) 120, a plurality of RTFSs 122, . . . , 124, fingerprint match systems 130, end-user devices 140, an applications and analytics module 150, and a timeline/event creation module 160. In some instances, at least some of the functions of the monitor application module 115 and of the RTEM 120 may be combined and may be provided by a common device or component of the ACR system 100.

The ACR system 100 may also comprise an NTP server 170 that is operable to provide synchronization to various parts of the ACR system 100 via a common reference clock. For example, the NTP server 170 may be operable to synchronize the operation of the RTEM 120 with the operation of the RTFSs 122, . . . , 124. The operations of the NTP server 170 may be based on, for example, the Internet Engineering Task Force (IETF) RFC 5905 "Network Time Protocol Version 4: Protocol and Algorithms Specification."

The offline fingerprint module 110 may comprise suitable logic, circuitry, code, and/or interfaces that may be operable to handle the offline fingerprinting portion of the operations performed by the ACR system 100. The offline fingerprint module 100 may be operable to receive pre-recorded or offline content such as commercials, programs, and promotions, for example. In this regard, the offline fingerprint module 100 may be able to ingest and process content with defined interactivity. The monitor application module 115 may comprise suitable logic, circuitry, code, and/or interfaces that may be operable to process a network television feed and the content handled by the offline fingerprint module 110 to create a real-time timeline and/or real-time event triggers. During the process, the monitor application module 115, and/or the timeline/event creation module 160, may interact with backend analytics databases that comprise user-engagement data, for example. Some of the operations that may be performed by the offline fingerprint module 110 may comprise, for example, ingest operations, storage operations, monitoring operations, and/or content version comparison operations.

The RTEM 120 may comprise suitable logic, circuitry, code, and/or interfaces that may be operable to manage real-time events based on inputs provided by one or more sources. For example, the RTEM 120 may be operable to manage real-time events based on events stored in an interactive timeline archive, a network schedule, and/or those provided by an interactive director that may assign interactive event IDs to live programming as the network television feed is being fingerprinted in real time. Moreover, the RTEM 120 may be operable to trigger interactive events in legacy systems and/or in web-based systems. The RTEM 120 may be referred to as a real-time event trigger infrastructure, for example. The RTEM 120 may comprise a real-time event inserter (RTEI) (not shown), which is operable to insert the events into the RTFSs 122 . . . 124.

In accordance with an embodiment of the invention, the RTEM 120 may be operable to instruct the monitor application module 115, and/or the timeline/event creation module 160 to record the fingerprints associated with a live program as well as to store the corresponding set of events created during the live program in the interactive timeline archive. This enables playback of the program with interactivity even after expiration of the corresponding fingerprints in the vendor's third party database. This may occur in instances when there is a re-broadcast of the live event at a subsequent date. In the case of timeline based devices, the events may be stored and timeline retrieval may be enabled even during the active window of the corresponding fingerprints since there will be no available event-to-fingerprint association.

In accordance with an embodiment of the invention, the RTEM 120 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the Real-time event manager 120 may be operable to generate one or more signals that provide instructions to the RTFSs 122, . . . , 124 to enable the identification of a network television station based on the logo, symbol, sign, watermark, and/or text that are typically utilized to represent the network television station. The instructions may be related to information that is to be generated and/or provided to the end-user devices 140 for network television station identification. The instructions may indicate the type of information that is to be provided to the end-user devices 140 and/or when such information is to be provided. In some instances, a portion of the ACR system 100 other than the Real-time event manager 120, or in conjunction with the Real-time event manager 120, may generate the signals for providing instructions to the RTFSs 122, . . . , 124.

The RTFSs 122, . . . , 124 may comprise suitable logic, circuitry, code, and/or interfaces that may be operable to handle fingerprinting and fingerprint communications to the fingerprint match systems 130. Since each vendor or television manufacturer is likely to utilize its own fingerprint technology, each of the RTFSs 122, . . . , 124 may be a dedicated server for each of the fingerprint technologies supported by the ACR system 100. In some embodiments of the invention, a portion of the RTFSs 122, . . . , 124 may be operable to perform video fingerprinting while the remaining portion of the RTFSs 122, . . . , 124 may be operable to perform audio fingerprinting or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the RTFSs 122, . . . , 124 may be operable to receive one or more signals from the Real-time event manager 120 and/or from another portion of the ACR system 100 to enable the identification of a network television station based on the logo, symbol, sign, watermark, and/or text that are typically utilized to represent the network television station. The instructions may be utilized to determine and/or provide locations to the end-user devices 140 to take fingerprints of the video content being displayed on a viewing screen. In some instances, at least a portion of the fingerprinting locations may be provided by the Real-time event manager 120 and/or by another portion of the ACR system 100 through the instructions received by the RTFSs 122, . . . , 124. In other instances, the fingerprinting locations may be determined by the RTFSs 122, . . . , 124 based on locally and/or remotely stored information. Each fingerprinting location may comprise coordinates in a video frame (e.g., x coordinates, y coordinates) that indicate a particular region in the video frame to fingerprint.

The RTFSs 122, . . . , 124 may provide the fingerprinting locations for communication to the end-user devices 140, for example, in the form of fingerprint profiles. The fingerprint profiles may comprise fingerprinting locations and/or other information to be utilized by an end-user device for ACR fingerprinting. In some instances, the fingerprint profiles may be generated by the RTFSs 122, . . . , 124 in response to the instructions received. In other instances, the fingerprint profiles comprising the fingerprinting locations may be received by the RTFSs 122, . . . , 124 from the Real-time event manager 120 and/or from another portion of the ACR system 100. The fingerprint profile of a particular end-user device 140 may be updated based on an indication that additional and/or different locations may be needed during fingerprinting to identify the network television station logo or symbol being displayed on a viewing screen at the end-user device 140. The update may be generated by the corresponding RTFS and then communicated to the end-user device 140 or may be received by the corresponding RTFS from the Real-time event manager 120 and/or from another portion of the ACR system 100 and then communicated to the end-user device 140.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 140. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the RTFSs 122, . . . , 124 may be operable to communicate fingerprint profiles and/or fingerprint profile updates to the end-user devices 140 through the fingerprint match systems 130. Feedback and/or queries from the end-user devices 140 may be received by the RTFSs 122, . . . , 124 for processing. The RTFSs 122, . . . , 124 may in turn communicate information corresponding to the feedback and/or queries from the end-user devices 140 to the Real-time event manager 120 and/or to another portion of the ACR system 100 for further processing.

The fingerprint match systems 130 may comprise suitable logic, circuitry, code, and/or interfaces that may be operable to enable hosted services in the Internet for matching fingerprints produced by the RTFSs 122, . . . , 124 with fingerprints produced by the end-user devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the end-user devices 140 with fingerprints provided by the RTFSs 122, . . . , 124. When matches occur, the fingerprint match systems 130 may indicate that interactive events are to take place in the end-user devices 140. These interactive events may allow a viewer to be presented with information on the screen or display of an ACR-based device and to interact with the device based on the information presented.

The end-user devices 140 may comprise a plurality of devices such as connected TVs, connected TV with paired devices (e.g., tablets), and second screen devices such as smartphones and tablets, for example. The ACR-based devices may be referred to as end-user devices, for example. Since each of the fingerprint match systems 130 supports a different ACR or fingerprint technology, those end-user devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that support the compatible fingerprint technology.

The end-user devices 140 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 140 may be operable to receive a series of fingerprint profiles and/or fingerprint profile updates and may be operable to adjust ACR fingerprinting accordingly.

The applications and analytics module 150 may comprise suitable logic, circuitry, code, and/or interfaces that may be operable to provide data to the end-user devices 140, determine what platforms are to be served and when these platforms are to be served, handle communications with third-party partners and advertisers, handle communication with backend analytics databases, and determine unique responses for a given device request (e.g., fix targeting).

The timeline/event creation module 160 may comprise suitable logic, circuitry, code, and/or interfaces that may be operable to produce a timeline of the content in a program or show based on information provided by the monitor application module 115. The timeline/event creation module 160 may then provide the timeline created to the applications and analytics module 150 to have the timeline disseminated to the appropriate End-user devices 140 that may not support event-to-fingerprint association. Once the End-user devices 140 have the timeline for a particular program or show, they may monitor the program or show, relative to the timeline, and launch appropriate event requests when a specified point in the timeline indicates that a particular event is to take place.

Communication between the RTFSs 122, . . . , 124, and the fingerprint match systems 130 may occur through one or more wireless and/or wireline communication links. Similarly, communications between the fingerprint match systems 130 and the end-user devices 140 and/or the applications and analytics module 150 may occur through one or more wireless and/or wireline communication links. The communication links described above may support one or more communication protocols. For example, communication protocols based on Internet Protocol (IP) may be typically used. Accordingly, the RTFSs 122, . . . , 124, the fingerprint match systems 130, and the applications and analytics module 150 may comprise suitable logic, circuitry, code, and/or interfaces to enable the use of the communication protocols.

In operation, the monitor application module 115 and/or the RTEM 120 may generate and/or handle event identifiers or event triggers that correspond to specific times in a program. These event identifiers may be generated from live programming, from a network schedule, or from information provided by the offline fingerprint module 110. The event identifiers may be assigned to the appropriate fingerprints generated by the RTFSs 122, . . . , 124. Since each RTFS relies on a different fingerprint technology, system synchronization is needed to appropriately assign the event identifiers to the right spot on a video and/or audio sequence. Such synchronization may be achieved by the use of a common reference clock provided by the NTP server 170.

Each of the RTFSs 122, . . . , 124 may communicate the event identifiers and the fingerprints to its corresponding one of the fingerprint match systems 130. The fingerprint match systems 130 in turn receive fingerprints from their corresponding end-user devices 140 and try to match those fingerprints to the ones received from their corresponding RTFSs 122, . . . , 124. When a match occurs, the event identifier and/or other information may be passed to the appropriate ACR-based device. With this information, the ACR-based device may obtain, for example, interactive information (e.g., graphics) from the applications and analytics module 150. For example, a connected TV may receive code or data specific for that device from a content management system (CMS) via a cloud-based content delivery network (CDN). There may be other actions performed by the user in connection with the interactive event and/or other information presented or produced in connection with the interactive event.

In operation, the ACR system 100 may generate a fingerprint profile that may be communicated to one of the end-user devices 140. The fingerprint profile may be communicated through one or more of the Real-time event manager 120, one of the RTFSs 122, . . . , 124, and one of the fingerprint match systems 130. The fingerprint profile may comprise locations where the end-user device is to take fingerprints of the video content being reproduced by the device. Once the content is identified based on the fingerprints taken and subsequently matched in the corresponding fingerprint match system 130, it may be determined that the source of the content is not known. Knowing the source of the content may be needed in some instances to enable interactive events associated with that source on the end-user device. Otherwise, an interactive event from, for example, one network television station may occur when a viewer is watching programming provided by a different network television station.

When the source of the content is not known, the end-user device may automatically utilize additional locations provided in the fingerprint profile or in a fingerprint profile update. These locations may correspond to the region in the video frame where the network television station logo or symbol is typically placed. Once these fingerprints are taken, they may be compared to fingerprints of the network television station logo or symbol at the corresponding fingerprint match systems 130. When a match occurs and the logo is identified, the end-user device may be able to receive interactive event identifiers from the corresponding RTFS. Once these interactive event identifiers are received, the end-user device may communicate with the applications and analytics module 150 to enable the interactive events to occur.

Figure 2A:
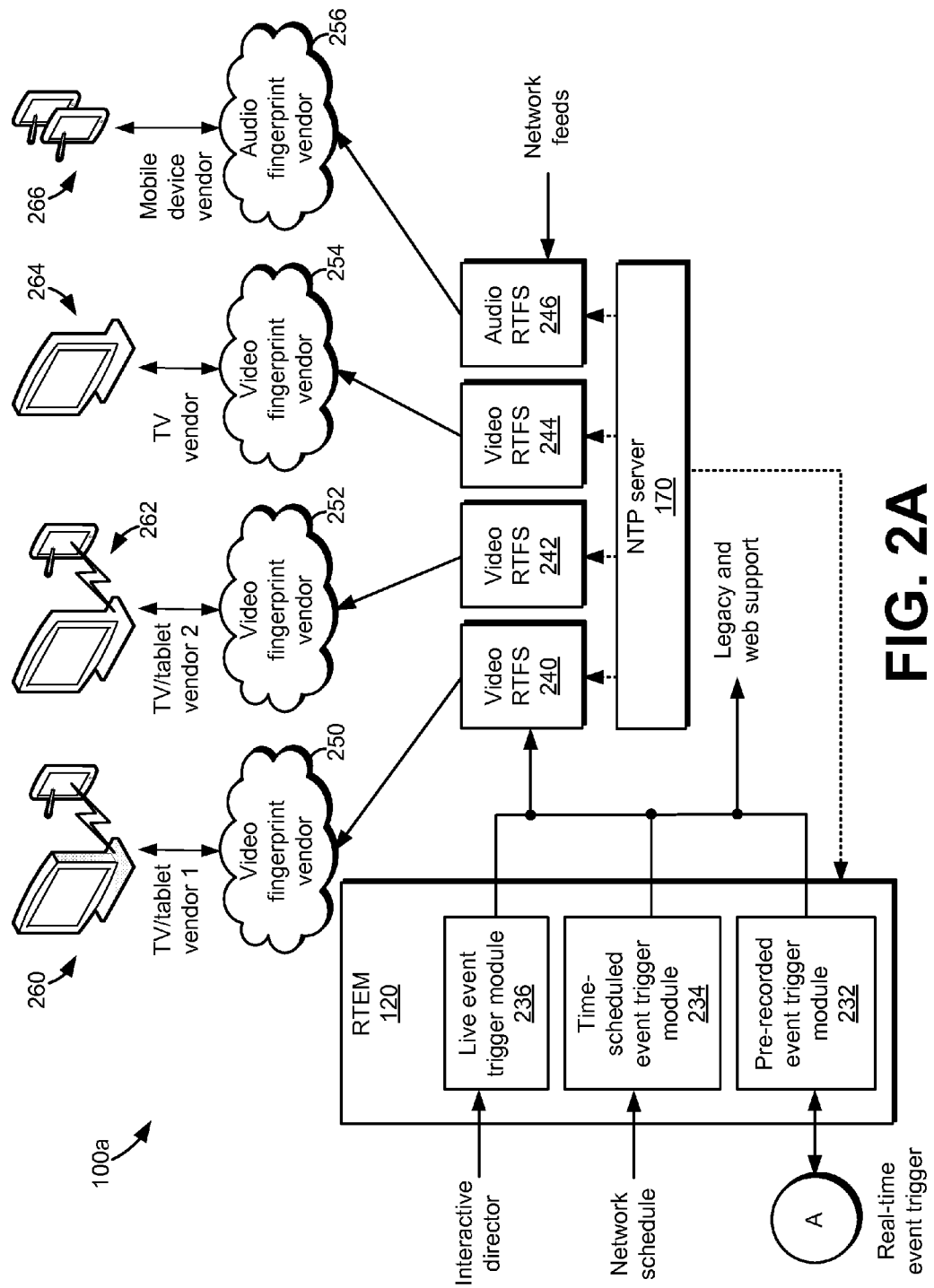
FIG. 2A and FIG. 2B are each a block diagram that illustrates details of an exemplary automatic content recognition system, which may be utilized for detecting and resolving overlay conflicts, in accordance with an exemplary embodiment of the invention.
Figure 2B:
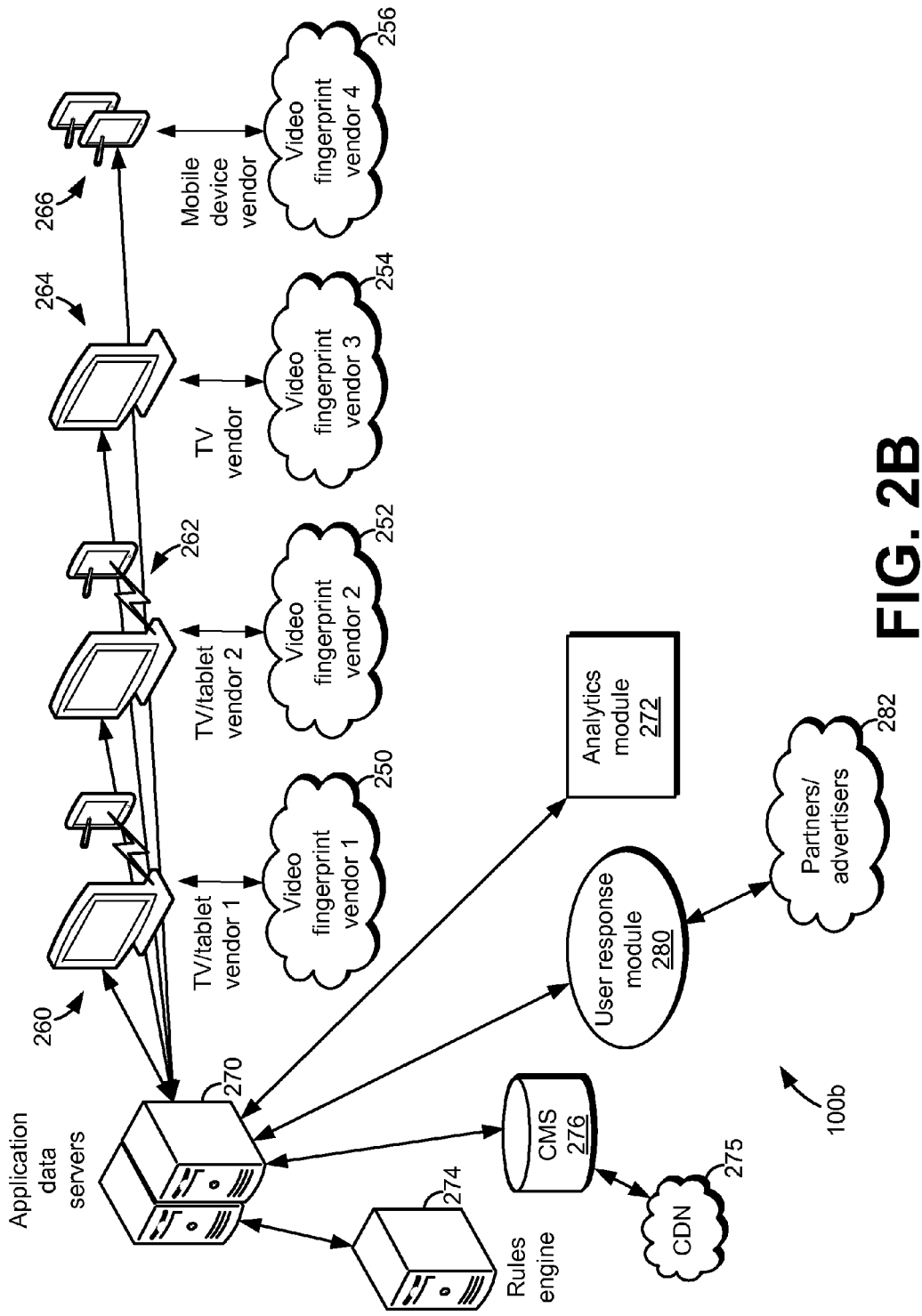

FIG. 2A and FIG. 2B are each a block diagram that illustrates details of an exemplary automatic content recognition system, which may be utilized for detecting and resolving overlay conflicts, in accordance with an exemplary embodiment of the invention. Referring to FIG. 2A, there is shown a portion 100a of the ACR system 100 shown above with respect to FIG. 1 that may comprise the RTEM 230, video RTFSs 240, 242, and 244, an audio RTFS 246, video fingerprint vendors 250, 252, and 254, and an audio fingerprint vendor 256. The number of video RTFSs and corresponding video fingerprint vendors as well as the number of audio RTFSs and corresponding audio fingerprint vendors shown in FIG. 2A are provided by way of illustration and not of limitation. More or fewer video RTFSs and corresponding video fingerprint vendors may be utilized in the ACR system 100. Similarly, the ACR system 100 may utilize more or fewer audio RTFSs and corresponding audio fingerprint vendors than those shown in FIG. 2A. The NTP server 170 of FIG. 1 is shown providing reference timing to the RTEM 230 and the RTFSs 240, 242, 244, and 246.

Also shown in FIG. 2A are various end-user devices such as connected TVs with paired devices 260 and 262, connected TVs without paired devices 264, and mobile devices 266, such as smartphones (e.g., iPhone, Android, etc.) and tablets (e.g., iPad, Samsung Galaxy, etc.). A paired device associated with the connected TVs may be a tablet, smartphone, or other like devices, for example.

The end-user devices 260 may be operable to utilize the same video fingerprinting technology (e.g., video ACR) utilized by the video RTFS 240 and supported by the video fingerprint vendor 250. The video fingerprint vendor 250 may be a vendor, manufacturer, or other third-party service provider that may comprise suitable logic, circuitry, code, and/or interfaces operable to provide hosted services over the Internet (e.g., cloud computing, etc.) for the end-user devices 260. These services may comprise video fingerprint matching as well as the delivery of any interactive event IDs associated with a match. The services may also comprise the communication of fingerprint profiles and/or other related information to the end-user devices 260 and/or the reception of feedback and/or queries from the end-user devices 260 to be communicated to the video RTFS 240. In addition, the video fingerprint vendor 250 may provide a network television station identifier and/or network timing information (e.g., heartbeat message or NTP-based network timestamp) that may be utilized by the end-user devices 260 for ACR-related applications and/or to maintain synchronization with the network television feed. The end-user devices 260 may comprise suitable logic, circuitry, code, and/or interfaces that may be operable to take and send video fingerprints to the video fingerprint vendor 250 for matching.

The end-user devices 262 may be operable to utilize the same video fingerprinting technology utilized by the video RTFS 242 and supported by the video fingerprint vendor 252. The video fingerprinting technology utilized by the end-user devices 262 may be different from that utilized by the end-user devices 260. The video fingerprint vendor 252 may be a vendor, manufacturer, or other third-party service provider that may comprise suitable logic, circuitry, code, and/or interfaces operable to provide hosted services over the internet for the end-user devices 262. These services may comprise video fingerprint matching as well as the delivery of any interactive event IDs associated with a match. The services may also comprise the communication of fingerprint profiles and/or other related information to the end-user devices 262 and/or the reception of feedback and/or queries from the end-user devices 262 to be communicated to the video RTFS 242. In addition, the video fingerprint vendor 252 may provide a network television station identifier and/or network timing information that may be utilized by the end-user devices 262 for ACR-related applications and/or to maintain synchronization with the network television feed. The end-user devices 262 may comprise suitable logic, circuitry, code, and/or interfaces that may be operable to take and send video fingerprints to the video fingerprint vendor 252 for matching.

The end-user devices 260 and 262 may be operable with a second device (e.g., smartphones, tablets) that may be paired to the parent device. In this regard, the second device may comprise suitable logic, circuitry, code, and/or interfaces that may be operable to take and send video and/or audio fingerprints to a corresponding video fingerprint vendor for matching or enable suitable pairing with the parent device to provide analogous functionality.

The end-user devices 264 may utilize the same video fingerprinting technology utilized by the video RTFS 244 and supported by the video fingerprint vendor 254. The video fingerprint vendor 254 may be a vendor, manufacturer, or other third-party service provider that may comprise suitable logic, circuitry, code, and/or interfaces operable to provide hosted services over the Internet for the end-user devices 264. These services may comprise video fingerprint matching as well as the delivery of any interactive event IDs associated with a match. In addition, the video fingerprint vendor 254 may provide a network television station identifier and/or network timing information that may be utilized by the end-user devices 264 for ACR-related applications and/or to maintain synchronization with the network television feed. The end-user devices 264 may comprise suitable logic, circuitry, code, and/or interfaces that may be operable to take and send video fingerprints to the video fingerprint vendor 254 for matching.

The end-user devices 266 may utilize the same audio fingerprinting technology (e.g., audio ACR) utilized by the audio RTFS 246 and supported by the audio fingerprint vendor 256. The end-user devices 266 may be referred to as second-screen devices, for example. The audio fingerprint vendor 256 may be a vendor, manufacturer, or other third-party service provider that may comprise suitable logic, circuitry, code, and/or interfaces operable to provide hosted services over the Internet for the end-user devices 266. These services may comprise audio fingerprint matching as well as the delivery of any interactive event IDs associated with a match. The services may also comprise the communication of audio fingerprint profiles and/or other related information to the end-user devices 266 and/or the reception of feedback and/or queries from the end-user devices 266 to be communicated to the audio RTFS 246. Audio fingerprint profiles may comprise information related to the characteristics (e.g., segments, frequencies) of the audio fingerprints to be taken by the end-user devices 266. In addition, the audio fingerprint vendor 256 may provide a network television station identifier and/or network timing information that may be utilized by the end-user devices 260 for ACR-related applications and/or to maintain synchronization with the network television feed. The end-user devices 266 may comprise suitable logic, circuitry, code, and/or interfaces that may be operable to take and send audio fingerprints to the audio fingerprint vendor 256 for matching.

The RTFSs 240, . . . , 246 may comprise suitable logic, circuitry, code, and/or interfaces that may be operable to perform fingerprinting of content received from the network television feeds. Each video RTFS may utilize a different video fingerprinting technology or computation from that utilized by the other video RTFSs. Similarly, when more than one audio RTFS is utilized, its audio fingerprint technology or computation may be different from that utilized by the other audio RTFSs. That is, since each vendor supports a different technology for handling fingerprinting, dedicated RTFSs may be needed for each vendor and for that vendor's corresponding end-user devices. The RTFSs 240, ..., 246 may be operable to send fingerprints, interactive event IDs, television network station identifiers, and/or network timing information to their corresponding fingerprint vendors through one or more networks (e.g., wireline networks, wireless networks) and/or by utilizing one or more communication protocols.

The RTFSs 240, ..., 246 may be operable to handle instructions and/or information that enable the identification of a network television station based on the logo, symbol, sign, watermark, and/or text that are typically utilized to represent the network television station. In this regard, the RTFSs 240, ..., 246 may be operable to handle instructions and/or information as described above with respect to the RTFSs 122, ..., 124 that are illustrated in FIG. 1, for example.

The RTEM 230 may comprise suitable logic, circuitry, code, and/or interfaces that may be operable to perform real-time event triggering. In this regard, the RTEM 230 may be operable to manage real-time events based on inputs from different sources. For example, the RTEM 230 may comprise a pre-recorded event trigger module 232 to provide real-time triggering from the monitor application module 115 (shown in FIG. 1), a time-scheduled event trigger module 234 to schedule the occurrence of a trigger based on a broadcast schedule, and a live event trigger module 236, each of which is operable to handle a different type of input.

The pre-recorded event trigger module 232 may be operable to receive real-time event triggers from the timeline/event creation module 226 described above with respect to FIG. 2A. These interactive event IDs may be stored in the interactive timeline archive 222 and may be utilized by the pre-recorded event trigger module 232 to assign interactive events via, for example, defined APIs to fingerprints generated as the network television feeds are fingerprinted by the RTFSs 240, ..., 246.

The time-scheduled event trigger module 234 may be operable to receive a network or broadcast schedule and to assign, based on the network schedule, interactive events to fingerprints generated as the network television feed is fingerprinted by the RTFSs 240, ..., 246. The network or broadcast schedule can be in XML format or in some other structured data format, for example.

The live event trigger module 236 may be operable to received interactive event IDs assigned by an interactive director to live programming. The interactive director may be an operator that is responsible for inserting events into the live broadcast. For pre-produced content, for example, the interactive director may watch an episode and may determine when an interactive element is to take place, when to push a trivia question, when to push a fun fact, when to drive social engagement, and/or when to share a clip or post a comment. For live content, for example, the interactive director may determine when to trigger a poll question and may manage the prompting of interactive games and determine when to trigger particular questions to engage viewers in a friendly competition. For advertisement, for example, the interactive director may determine when to bring up an offer, when to prompt to prepare for interaction or interaction event, and/or determine how long to leave interactive content on screen based on frequency rules and/or time of day. When advertisement is pre-fingerprinted, for example, interactive advertisement activities may occur automatically.

The RTEM 230 may also be operable to trigger interactive events in legacy television systems and/or in web-based systems. The infrastructure provided by the RTEM 230 may support the triggering of interactive events against applications and set-top boxes (STBs) via enhanced television binary interchange format (EBIF), hypertext transfer protocol (HTTP) live streaming (HLS) via ID3 tags, and satellite delivery systems (e.g., DISH, DirectTV) via the appropriate mechanism on the corresponding STB software platform. For HLS an ID3 tag may be utilized for sending interactive event IDs, for example.

The RTEM 230 may be operable to assign interactive event IDs to particular fingerprints in a sequence of audio or video fingerprints generated by the RTFSs 240, ..., 246. The RTEM 230 may also be operable to provide television network station identifiers and/or network timing information associated with any sequence of fingerprints.

In the example shown in FIG. 2B, the RTFSs 240, ..., 246 may correspond to the RTFSs 122, ..., 124, the fingerprint vendors 250, ..., 256 may correspond to the fingerprint match systems 130, and the end-user devices 260, ..., 266 may correspond to the end-user devices 140, which are illustrated in FIG. 1.

The RTEM 230 may be operable to handle instructions and/or information that enable the identification of a network television station based on the logo, symbol, sign, watermark, and/or text that are typically utilized to represent the network television station. In this regard, the Real-time event manager 230 may be operable to handle instructions and/or information as described above with respect to the Real-time event manager 120 that is illustrated in FIG. 1, for example.

In operation, the RTEM 230 may generate and/or handle one or more interactive event IDs that correspond to a particular set of fingerprints generated by the RTFSs 240, ..., 246. The RTEM 230 may have determined the interactive event IDs based on live event inputs, time-scheduled event inputs, and/or pre-recorded event inputs. The RTEM 230 may assign or associate the interactive event IDs to their appropriate fingerprints based on the synchronization of its operation to the operation of the RTFSs 240, ..., 246 via broadcast NTP. The RTEM 120 may also provide television network station identifiers and/or network timing information to the RTFSs 240, ..., 246. The RTFSs 240, ..., 246 may communicate the fingerprints, interactive event IDs, the television network station identifiers, and/or the network timing information to their corresponding fingerprint vendors.

The client or end-user devices may take and send fingerprints to their corresponding fingerprint vendors, which in turn determine whether there is a match with the fingerprints received from the RTFSs. Upon detection or determination of a match, the fingerprint vendors may return to the viewer device various pieces of information, including but not limited to network timing information and any interactive event ID that is triggered as a result of the match.

The portion 100a in FIG. 2A may also illustrate the implementation of an abstraction layer that enables the ACR system 100 to assign the same interactive event identifiers to different sets of video and/or audio fingerprints that are generated from different fingerprint technologies. That is, by appropriately timing the assignment of interactive event identifiers to multiple sequences of fingerprints that are generated from the same video content but with different fingerprinting technologies, the ACR system 100 may be able to support fingerprinting technologies from multiple vendors. Such implementation may provide flexibility by enabling a vendor to update its fingerprinting technology without affecting other fingerprinting technologies. Moreover, the architecture of the ACR system 100 may provide scalability by enabling new or additional fingerprint technologies from other vendors or from the same vendors to be added and supported.

Referring to FIG. 2B, there is shown a portion 100b of the ACR system 100 that may comprise the end-user devices 260, . . . , 266 and the fingerprint vendors 250, . . . , 256 shown in FIG. 2A. Also shown are application data servers 270, an analytics module 272, a rules engine 274, a cloud-based content delivery network (CDN) 275, and a content management system (CMS) 276. In addition, FIG. 2B shows a user response module 280 and third-party partners/advertisers 282.

The application data servers 270 may comprise suitable logic, circuitry, code, and/or interfaces that may be operable to receive from a viewer device, information related to an interactive event ID, a network television station, fingerprinted broadcast time, CID and additional data, and/or a device type. The information may be provided by the viewer device in response to a match between a fingerprint taken by the device and a fingerprint taken by the corresponding RTFS. Once a match occurs and the viewer device obtains the appropriate information from its corresponding fingerprint vendor, the viewer device may communicate the information to the application data servers 270, which in turn returns the appropriate content that corresponds to the interactive event ID and related data in a callback. Content may be pushed to a second screen or device paired with a connected TV that is logged in to an appropriate application or Web page.

The application data servers 270 may be operable to send information to the analytics module 272 as to what kind of interactions (e.g., clicks, selections, options, viewing behavior on a given broadcaster's network) are taking place in a viewer device. The application data servers 270 may be operable to handle the flow of user response data with third-party partners and/or advertisers 282. The user response data may comprise, but need not be limited to, TV IDs, coupon IDs, and event IDs, for example. Communication of the user response data between the application data servers 270 and the third-party partners/advertisers 282 may be handled by the user response module 280, for example. The application data servers 270 may be operable to, acquire assets, for example, text, banners, graphics, overlays, and/or video from the CMS 276.

The application data servers 270 may also be operable to deliver event schedules to end-user devices, to deliver correct content uniform resource locator (URL) based on the type of viewer device, to integrate with a variety of back-end systems, to integrate with polling servers (not shown), to integrate with gaming services such as leader boards, and/or to integrate with customer databases such as those used in connection with store user preferences and social circle members, for example. With respect to integrating with back-end systems, the application data servers 270 may, for example, integrate with social networks for storage of tweets for later playback and/or to filter comments and push back to applications.

The rules engine 274 may comprise suitable logic, circuitry, code, and/or interfaces that may be operable to determine which platforms (e.g., end-user devices) are to be served and when are those platforms to be served by the application data servers 270. The rules engine may be preconfigured and/or dynamically configured.

The CMS 276 may comprise suitable logic, circuitry, code, and/or interfaces that may be operable to store the content that is delivered to the end-user devices. For example, content that may be delivered may comprise text, banners, graphics, overlays, and video. Other examples of content may comprise polls and fun facts, clips to share, games and trivia, and advertising content. These examples are provided by way of illustration and not of limitation. Accordingly, other examples of contents that may be utilized for user interactive events with the end-user devices may also be stored in the CMS 276.

The CMS 276 may comprise suitable logic, circuitry, code, and/or interfaces that may be operable to enable communication between the application data servers 270 and the CDN 275. The CMS 276 is operable to post assets to the CDN 275. ACR-based devices are operable to download the assets such as graphics, banners, overlays, video, for example, from the CDN 275.

The analytics module 272 may comprise suitable logic, circuitry, code, and/or interfaces that may be operable to receive user interaction information from the application data servers 270 or directly from the viewing devices. The analytics module 272 may be operable to communicate with the fingerprint vendors 250, . . . , 256 to receive information and determine what is being watched or viewed in various viewer devices. The analytics module 272 may comprise one or more back-end databases to store, mange, and/or process user information.

In operation, content may be provided by the application data servers 270 to one of the end-user devices 260, . . . , 266 in response to receiving an interactive event ID, a network television station, device type, and other data from that viewer device. Rules regarding which viewer device is to be served, and when the device may be served, may be determined by the rules engine 274. The content to be served by the application data servers 270 to the viewer device may be stored in the CMS 276.

The analytics module 272 may determine which viewers are interacting with content and what those viewers are watching based on information received from the application data servers 270 or directly from the viewing devices. Viewer responses that result from interactive events may be handled by the user response module 280, which in turn communicates with third-party partners/advertisers 282.

The third-party partners/advertisers 282 may comprise and/or be connected to advertisement servers and/or one or more fulfillment systems. The advertisement servers may be utilized to deliver advertisement overlays to ACR-based applications running on end-user devices. The advertisement servers may also be operable to support the tracking of user impressions and click-throughs and/or to perform other advertising-related functions.

The fulfillment systems may utilize one or more technologies to fulfill viewer requests that occur in connection with ACR-based applications and user interaction. Examples of such technologies may comprise, but need not be limited to, coupon delivery technologies, technologies for movie ticket purchases and delivery, and/or short message service/multimedia messaging service (SMS/MMS) gateways.

Figure 2C:
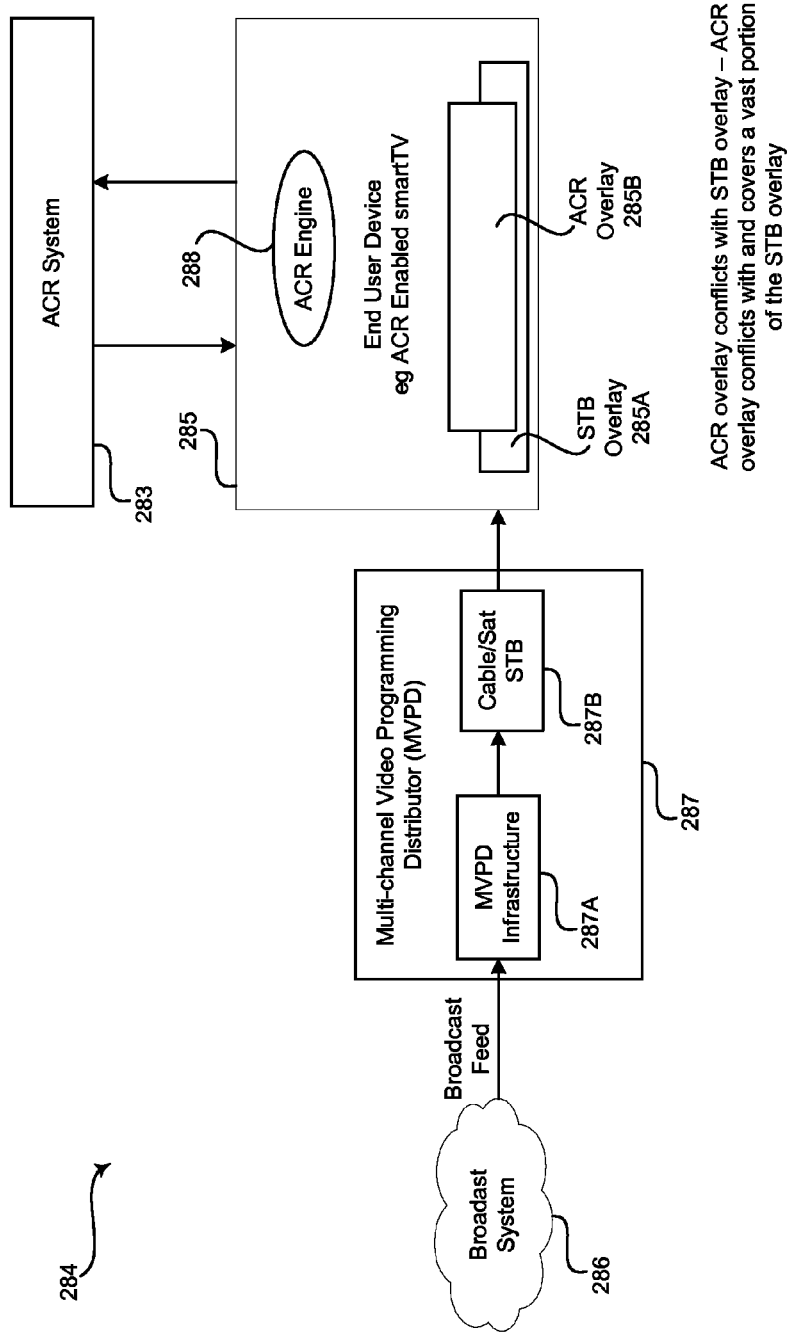
FIG. 2C is a diagram that illustrates a conflict with concurrent display of overlays, in accordance with an exemplary embodiment of the invention.

FIG. 2C is a diagram that illustrates a conflict with concurrent display of overlays, in accordance with an exemplary embodiment of the invention. Referring to FIG. 2C, there is shown a system 284 that may be operable to concurrently display overlays that conflict. The system 284 may comprise an end-user device 285, a broadcast system 286, a multi-channel video programming distributor (MVPD) 287, an ACR system 283, and a cable and/or satellite set-top box 287B. The end-user device 285 may comprise an ACR engine 288. The multi-channel video programming distributor 287 may comprise an MVPD infrastructure 287A and a cable/satellite set-top box 287B.

The end-user device 285 may comprise suitable logic, circuitry, interfaces and/or code that may be operable to consume content and perform automatic content recognition. In some instances, the end-user device 285 may be operable to present an overlay when an ACR event is triggered. For example, the end-user device 285 may present the ACR overlay 285B when an ACR event is triggered. In an exemplary embodiment of the invention, the end-user device 285 may comprise an ACR-enabled smartTV. The end-user device 285 may be operable to communicate with the ACR system 283 and/or a cloud (not shown) via any available Internet access method such as, for example, cable modem (DOCSIS based), xDSL, satellite, WiMax (802.16), and so on.

The broadcast 286 may be operable to provide content to the end-user device 285, via the MVPD 287, for consumption. The broadcast and ACR system 286 may comprise for example, a xDSL infrastructure, a wireless infrastructure such as a WiMAX, a cable infrastructure, and/or a satellite infrastructure. The cable infrastructure may be operable to communicate content to the end-user device 285, utilizing cable technologies such as DOCSIS. The satellite infrastructure may be operable to communicate content to the end-user device 285, utilizing various satellite communication technologies.

The ACR system 283 may be substantially similar to the ACR system, which is described, for example, with respect to FIG. 1, FIG. 2A and FIG. 2B.

The multichannel video programming distributor 287 may comprise suitable interfaces and/or devices that may be operable to deliver modulated broadcast feed from the broadcast system 286 to the end-user device 285. In this regard, the multichannel video programming distributor 287 may be operable to deliver live linear content to the end-user device 285. The multichannel video programming distributor 287, may comprise a radio frequency (RF), an intermediate frequency (IF), satellite, cable, and/or IP based distribution system. The multichannel video programming distributor 287 may be operable to receive live linear content from the broadcast system 286.

The multichannel video programming distributor infrastructure 287A may comprise suitable devices and/or interfaces that may be operable to receive live linear content from the broadcast system 286. In this regard, the MVPD infrastructure 287A may comprise, for example, xDSL, wireless such as WiMax, satellite and/or cable equipment and infrastructure. For example, the MVPD infrastructure 287A may receive live linear content from a satellite network 208, an IP network, a WiMax system, an xDSL system and so on. The MVPD infrastructure 287A may be operable to communicate, for example, the modulated live linear content to the set-top box 287B.

The cable and/or satellite set-top box 287B may comprise suitable logic, circuitry, interfaces and/or code that may be operable to handle operations such as modulation/demodulation and security for communication between the MVPD infrastructure 287A and the end-user device 285. In instances where a cable infrastructure is utilized, the cable and and/satellite set-top box 287B may comprise a cable modem. In instances where a satellite infrastructure is utilized, the cable and and/satellite set-top box 287B may comprise a satellite demodulator. The cable and/or satellite set-top box 287B may also be operable to generate an overlay, for example, the STB overlay 285A.

The ACR engine 288 may comprise suitable logic, circuitry, interfaces and/or code that may be operable to provide automatic content recognition operation for the end-user device 285. The ACR engine 288 may be operable to monitor content and accordingly detect when an ACR event is triggered. In some instances the triggered ACR event may cause the end-user device 285 to present the ACR overlay 285B.

During operation, the ACR engine 288 may be operable to present the ACR overlay 285B concurrent with the presentation of the STB overlay 285A by the cable and and/satellite set-top box 287B. As illustrated in FIG. 2C, the concurrent presentation of the ACR overlay 285B and the STB overlay 285A creates a conflict since the ACR overlay 285B covers and obscures a portion of the STB overlay 285A.

In accordance with various embodiments of the invention, the system 284 may be operable to detect when there is a conflict with the presentation of at least two overlays and accordingly resolve the conflict.

The end-user device 285 may be operable to utilize automatic content recognition operations to detect when a conflict occurs on a channel with concurrent presentation of the ACR overlay 285B and the STB over overlay 285A on the end-user device 285. Once the conflict is detected, the end-user device 285 may be operable to control and/or modify the presentation of the ACR enabled overlay 285B in order to resolve the conflict.

In an exemplary embodiment of the invention, the end-user device 285 may utilize the automatic content recognition operations to determine an identity of the channel on which the conflict occurs. An identifier that is unique to the channel may be utilized to determine the identity of the channel. In this regard, in accordance with various embodiments of the invention, the end-user device 285 may be operable to determine the identity of a channel based on the unique identifier of the channel, which may comprise, for example, a channel logo, a sign, a watermark, text and/or animation.

Based on the determined identity of the channel, the end-user device 285 may determine the general location where overlays are normally placed for the channel. This may be accomplished automatically by revealing historical overlay patterns or via an overlay profile that is sent to the device and/or the ACR system 283 a priori. Accordingly, the end-user device 285 may utilize that determined general location as the location where the STB overlay 285A may be located for the channel. Based on the determined location where the STB overlay 285A may be located for the channel, the end-user device 285 may determine one or more locations where the ACR overlay 285B may be positioned so that it does not conflict with STB overlay 285A. The end-user device 285 may then position or relocate the ACR overlay at one of those locations to resolve or prevent the conflict.

FIG. 2D is a diagram that illustrates the positioning or relocation of an ACR overlay to prevent a conflict, in accordance with an embodiment of the invention. Referring to FIG. 2D, there is shown the STB overlay 285A and the ACR overlay 285B. The ACR overlay 285B has been positioned or relocated so that it does not conflict with the STB overlay 285A.

In accordance with another embodiment of the invention, the end-user device 285 may utilize the automatic content recognition operations to determine a corresponding size of the STB overlay 285A for the channel. When the conflict is detected, the end-user device 285 may determine a new size of the ACR overlay 285B for the channel and time of presentation in order to prevent or resolve the conflict. In this regard, the end-user device 285 may size or resize the ACR overlay for the channel based on the determined new size.

FIG. 2E is a diagram that illustrates the sizing or resizing of an ACR overlay to prevent a conflict, in accordance with an embodiment of the invention. Referring to FIG. 2E, there is shown the STB overlay 285A and the ACR overlay 285B. The ACR overlay 285B has been sized or resized so that it does not conflict with the STB overlay 285A. The resizing may be constrained to specific locations. In this regard, those constraints may be provided to the end-user device 285 or the ACR system 283 based, for example, on the particular channel.

In accordance with another embodiment of the invention, the end-user device 285 may be operable to defer presentation of ACR overlay 285B for the channel whenever the conflict is detected. In this regard, the end-user device 285 may defer presentation and present the ACR overlay 285B at a subsequent time.

Figure 2F:
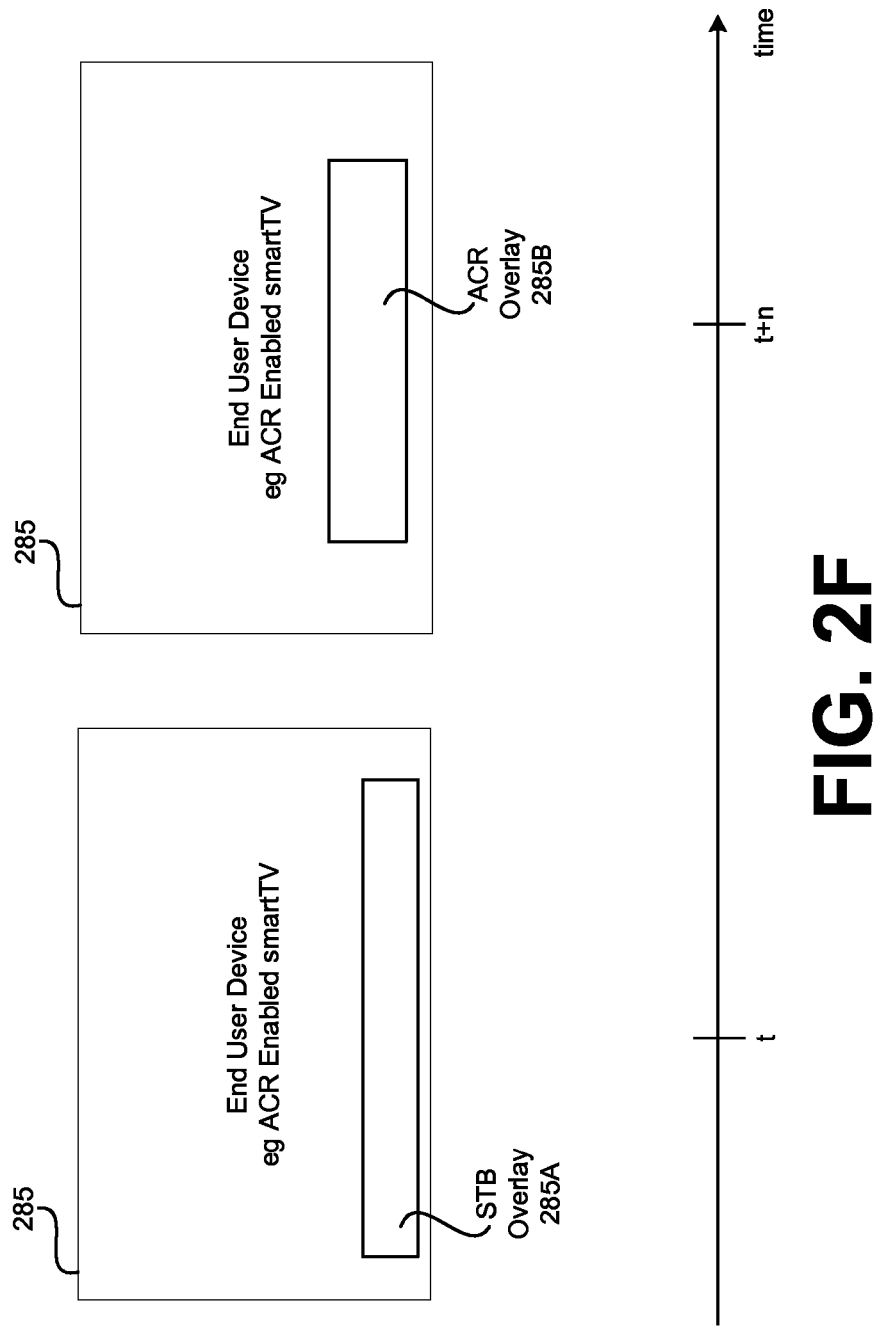
FIG. 2F is a diagram that illustrates deferring presentation of an ACR overlay to prevent a conflict, in accordance with an embodiment of the invention.

FIG. 2F is a diagram that illustrates deferring presentation of an ACR overlay to prevent a conflict, in accordance with an embodiment of the invention. Referring to FIG. 2F, there is shown the STB overlay 285A and the ACR overlay 285B. The STB overlay 285A is presented at a time t. The ACR overlay 285B has been presented at a time n later (i.e. (t+n)) so that it does not conflict with the STB overlay 285A.

In another embodiment of the invention, the end-user device 285 may be operable to cancel presentation of one of the ACR overlay 285B for the channel whenever the conflict is detected.

Figure 2G:
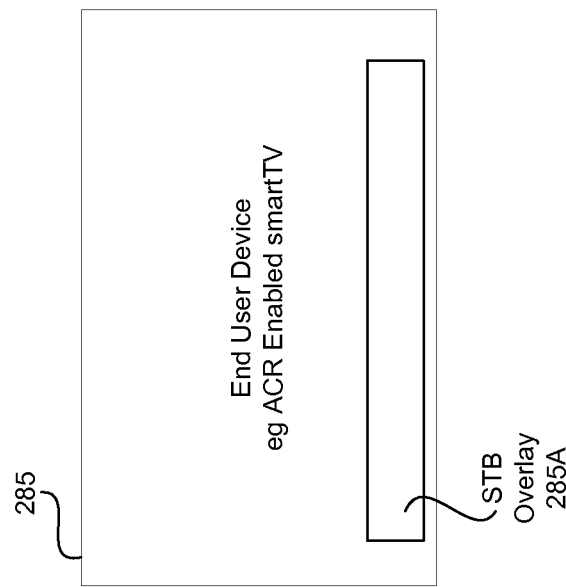
FIG. 2G is a diagram that illustrates canceling presentation of an ACR overlay to prevent a conflict, in accordance with an embodiment of the invention.

FIG. 2G is a diagram that illustrates canceling presentation of an ACR overlay to prevent a conflict, in accordance with an embodiment of the invention. Referring to FIG. 2G, there is shown the STB overlay 285A. The presentation of the ACR overlay 285B has been cancelled so that it does not conflict with the STB overlay 285A.

Figure 3A:
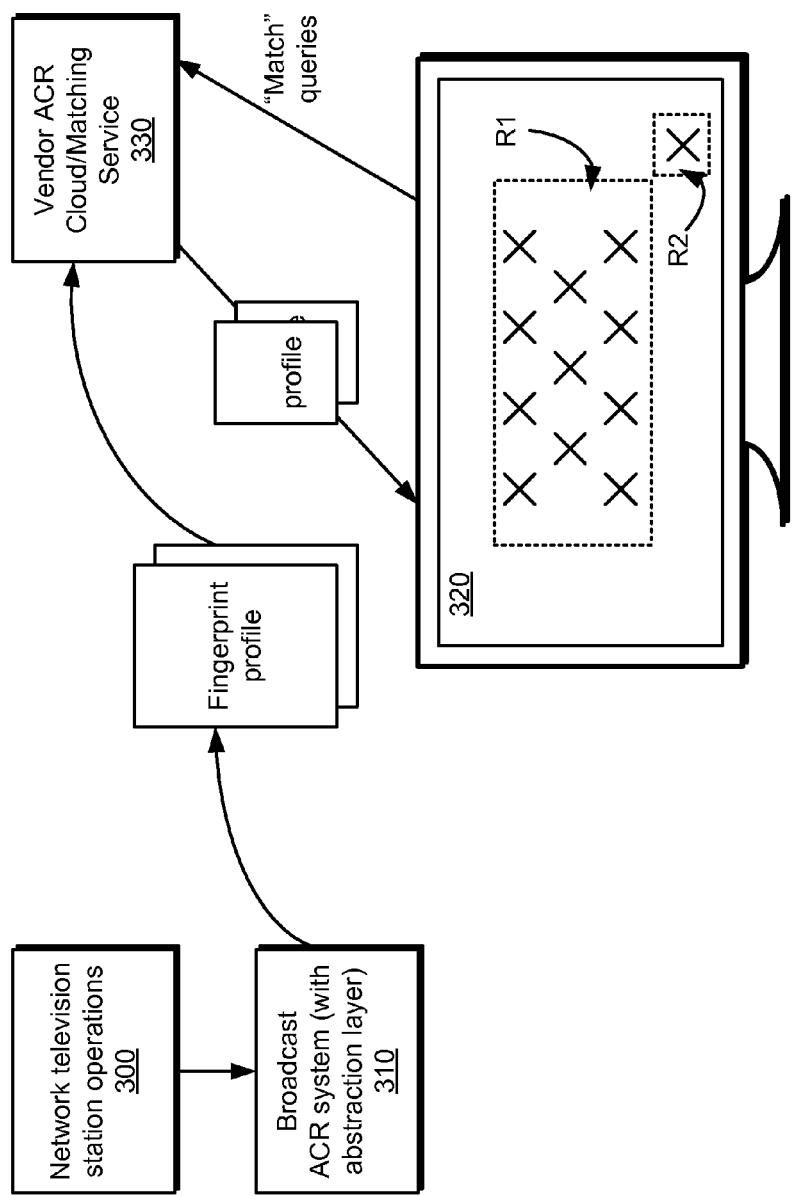
FIG. 3A is a diagram that illustrates an exemplary detection of logo identification based on automatic content recognition, in accordance with embodiments of the invention.

FIG. 3A is a diagram that illustrates an exemplary detection of logo identification based on automatic content recognition, in accordance with embodiments of the invention. Referring to FIG. 3A, there is shown a network television station operations 300, a broadcast ACR system (with abstraction layer) 310, an end-user device 320 and a vendor ACR cloud/matching service or system 330.

The network television station operations 300 may comprise suitable logic, circuitry, code, and/or interfaces that may be operable to provide information to the broadcast ACR system (with abstraction layer) 310. The information provided may comprise information regarding the content or programming that is transmitted or broadcast to the end-user device 320. In this regard, the network television station operations 300 may provide an indication to the broadcast ACR system (with abstraction layer) 310 that the content received by the end-user device 320 may be content that is concurrently transmitted by one or more additional network television stations (e.g., State of the Union address). The network television station operations 300 may be operable to generate one or more signals that comprise the indication and to communicate the one or more signals to the broadcast ACR system (with abstraction layer) 310.

The broadcast ACR system (with abstraction layer) 310 may correspond to at least a portion of the ACR system 100 described above with respect to FIGS. 1-2B. The broadcast ACR system (with abstraction layer) 310 may be operable to generate a fingerprint profile for the end-user device 320. The fingerprint profile may comprise multiple fingerprinting locations and/or other information that may be utilized by the end-user device 320 to perform ACR fingerprinting on video content.

The end-user device 320 may comprise suitable logic, circuitry, code, and/or interfaces that may be operable to perform ACR fingerprinting based on a fingerprint profile. In this regard, a synchronous event manager on device may be operable to receive the profile information and request the embedded ACR subsystem in end-user device 320 to execute sampling with the new profile. The end-user device 320 may be, for example, a smart or connected TV with built-in capabilities for ACR fingerprinting. In this regard, the end-user device 320 may correspond to one of the end-user devices described above with respect to FIG. 1, FIG. 2A and FIG. 2B.

The vendor ACR cloud/matching service or system 330 may comprise suitable logic, circuitry, code, and/or interfaces that may be operable to perform ACR related functions on the vendor side. The vendor ACR cloud/matching service or system 330 may comprise, for example, control functions and/or matching functions.

In operation, the broadcast ACR system (with abstraction layer) 310 may generate a fingerprint profile and may communicate the fingerprint profile to the end-user device 320 via the vendor ACR cloud/matching service or system 330. The end-user device 320 may utilize the fingerprint profile to take fingerprints in a first region, R1, of a video frame. As illustrated in FIG. 3A, there may be multiple fingerprinting locations (X) within R1 where the end-user device 320 may take fingerprints. The end-user device 320 may communicate the fingerprints to the broadcast ACR system (with abstraction layer) 310 to determine whether a match has occurred. If a match has occurred, that is, when the programming being watched with the end-user device 320 has been identified through ACR fingerprinting, the broadcast ACR system (with abstraction layer) 310 may then determine whether the source of the programming is known. When the source of the programming is not known or is uncertain or based upon a time schedule, the broadcast ACR system (with abstraction layer) 310 may generate a new fingerprint profile or a fingerprint profile update to send to the end-user device 320. The profile with logo may be issued by the ACR vendor and may be issued at a specific time as identified by the broadcast network.

The new fingerprint profile or a fingerprint profile update may comprise additional fingerprinting locations that correspond to a second region, R2, where the logo or symbol of the network television stations that provides the programming is typically placed. The end-user device 320 may take the additional fingerprints (along with the original) and may send those additional fingerprints to the broadcast ACR system (with abstraction layer) 310 for matching. In some instances, after receiving the additional fingerprinting locations, the end-user device 320 may query the broadcast ACR system (with abstraction layer) 310 to receive approval to utilize the additional fingerprinting locations.

When the logo or symbol fingerprints match those of the network television station associated with the broadcast ACR system (with abstraction layer) 310, the end-user device 320 may receive any interactive event identifiers that may be available for the programming being watched. That is, only when the logo displayed is identified as corresponding to the network television station associated with the broadcast ACR system (with abstraction layer) 310 may any interactive events related to the network television station occur on the end-user device 320.

In some embodiments of the invention, the network television station operations 300 may provide an indication to the broadcast ACR system (with abstraction layer) 310 that the programming provided to the end-user device 320 may be provided concurrently by other network television stations. When the same programming is provided by multiple sources, ACR fingerprinting may identify the content received but not the source of the content. In this instance, the fingerprint profile may comprise additional fingerprinting locations. The fingerprint profile may also comprise instructions to the end-user device 320 to utilize the additional fingerprinting locations automatically when the source of the programming is unknown or unclear. When such instructions are not provided to the end-user device 320 a priori, the end-user device 320 may query the broadcast ACR system (with abstraction layer) 310 to receive approval to utilize the additional fingerprinting locations.

Figure 3B:
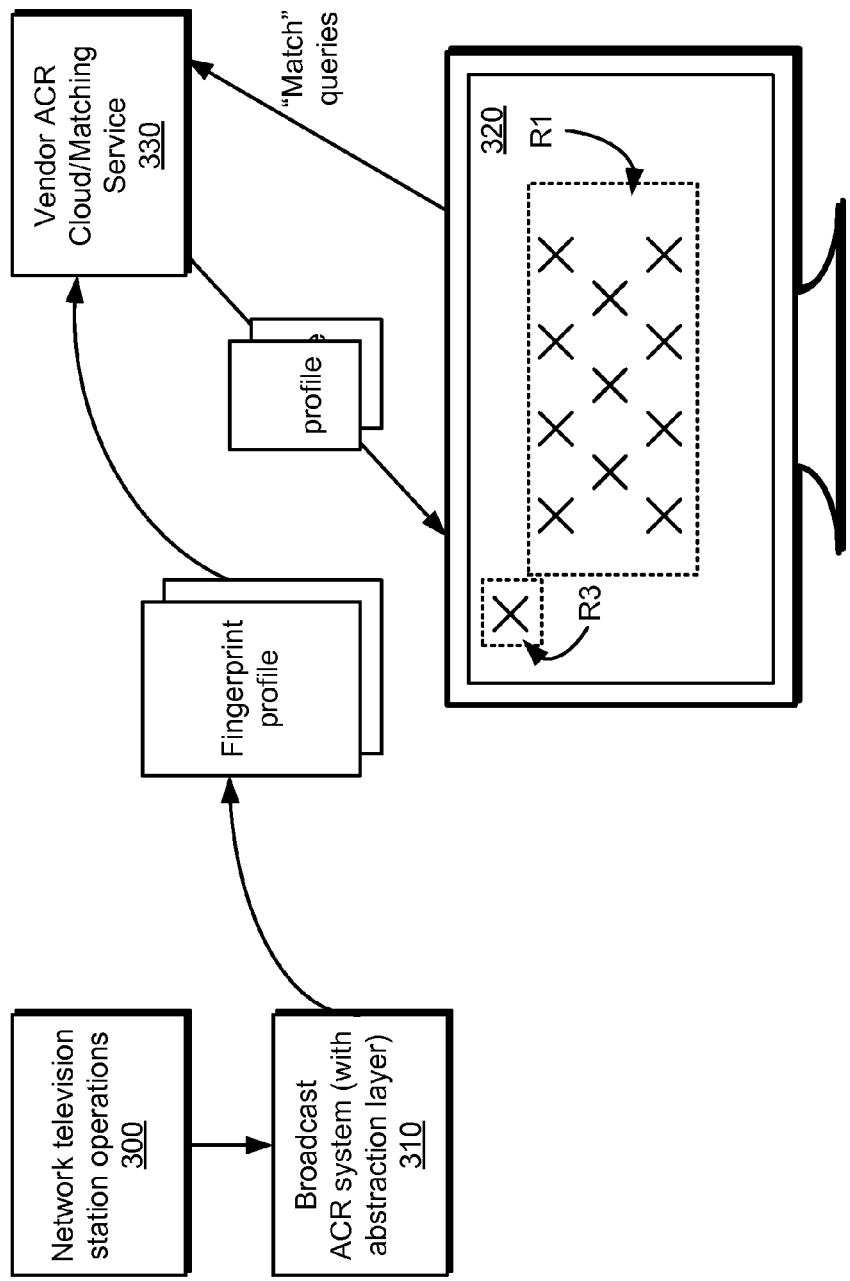
FIG. 3B is a diagram that illustrates an exemplary detection of logo identification based on automatic content recognition, in accordance with embodiments of the invention.

FIG. 3B is a diagram that illustrates an exemplary detection of logo identification based on automatic content recognition, in accordance with embodiments of the invention. Referring to FIG. 3B, there is shown the network television station operations 300, the broadcast ACR system (with abstraction layer) 310, the end-user device 320 and a vendor ACR cloud/matching service 330. When the ACR fingerprinting associated with R1 indicates that the content or programming being watched corresponds to a programming or schedule guide, for example, the placement of the logo or symbol of the network television station on a video frame may be different from the placement during other types of programming. In such instances, the additional fingerprinting locations provided by the broadcast ACR system (with abstraction layer) 310 may correspond to a third region, R3, where the logo or symbol of the network television station is typically placed when a programming or schedule guide is displayed.

Figure 4A:
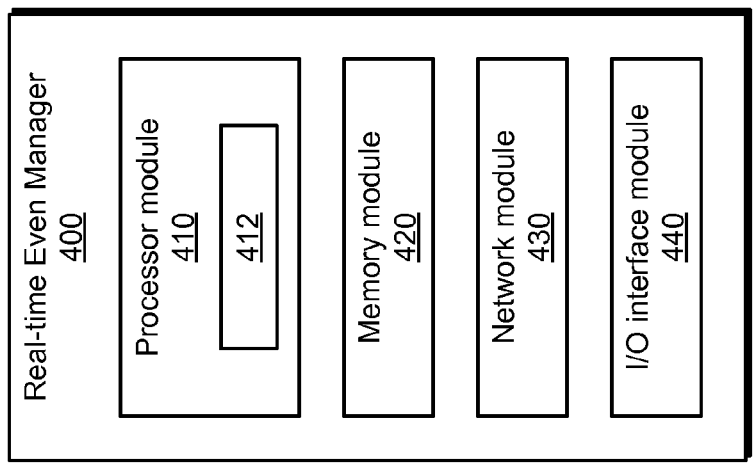
FIG. 4A is a block diagram that illustrates an exemplary real-time event manager (RTEM), in accordance with an exemplary embodiment of the invention.

FIG. 4A is a block diagram that illustrates an exemplary real-time event manager (RTEM), in accordance with an exemplary embodiment of the invention. Referring to FIG. 4A, there is shown a real-time event manager (RTEM) 400 that may correspond to the RTEM 120 (FIG. 1), and the RTEM 230 (FIG. 2A), which are described above. The RTEM 400 may comprise a processor module 410, a memory module 420, a network module 430, and an input/output (I/O) interface module 440.

The processor module 410 may comprise suitable logic, circuitry, code, and/or interfaces that may be operable to perform the operations, functions, processes, computations, and the like described herein with respect to the RTEMs 120 and 230. In this regard, the processor module 410 may be operable to enable an abstraction layer utilized for supporting fingerprint technologies from different vendors.

The processor module 410 may be operable to handle events such as live events, time-scheduled events, and pre-recorded events. The processor module 410 may be operable to assign interactive event IDs or similar information to video and/or audio fingerprints generated by one or more RTFSs. Moreover, the processor module 410 may be operable to handle network timing information for synchronizing the operation of the RTFSs.

The processor module 410 may comprise at least one processing device 412. The processing device 412 may be a central processing unit (CPU), a digital signal processor (DSP), and/or other type of integrated circuit that may be utilized to perform data processing operations.

The memory module 420 may comprise suitable logic, circuitry, code, and/or interfaces that may be operable to store information utilized to enable the abstraction layer. The network module 430 may comprise suitable logic, circuitry, code, and/or interfaces that may be operable to allow the RTEM 400 to communicate with one or more RTFSs such as the RTFS 450 (FIG. 4B) and/or with an offline infrastructure such as the offline fingerprint module 110 described above with respect to FIG. 1. The network module 430 may be operable to support one or more communication protocols such as wireline protocols and/or wireless protocols. The network module 430 may be operable to receive information related to time-scheduled events and/or pre-recorded events.

The I/O interface module 440 may comprise suitable logic, circuitry, code, and/or interfaces that may be operable to interact with one of more sources of interactive events information such as an interactive director, for example.

Figure 4B:
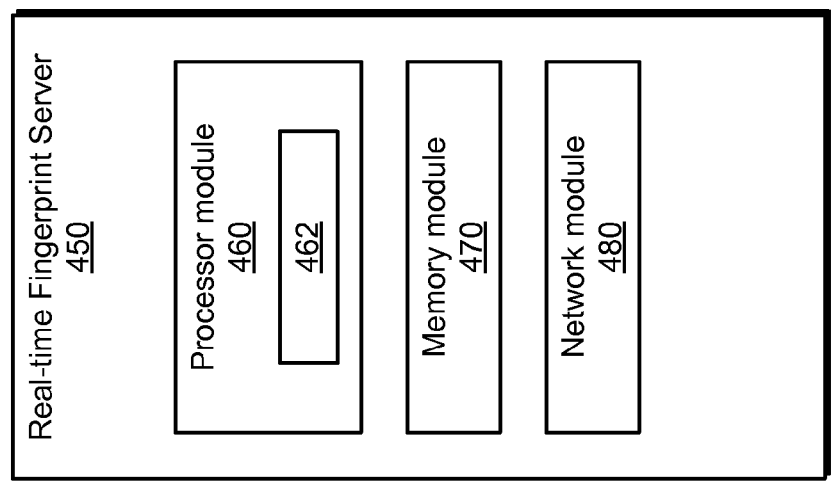
FIG. 4B is a block diagram that illustrates an exemplary real-time fingerprint server (RTFS), in accordance with an exemplary embodiment of the invention.

FIG. 4B is a block diagram that illustrates an exemplary real-time fingerprint server (RTFS), in accordance with an exemplary embodiment of the invention. Referring to FIG. 4B, there is shown a real-time fingerprint server (RTFS) 450 that may correspond to one of the RTFSs 122, . . . , 124 or one of the RTFSs 240, . . . , 246 described above. The RTFS 450 may comprise a processor module 460, a memory module 470, and a network module 480.

The processor module 460 may comprise suitable logic, circuitry, code, and/or interfaces that may be operable to perform the operations, functions, processes, computations, and the like described herein with respect to the RTFSs 122, . . . , 124 and the RTFSs 240, . . . , 246. In this regard, the processor module 460 may be operable to perform fingerprinting operations for a vendor-specific technology that may be provided for broadcasting to the network module 480, for example. Since the processor module 460 or other similar module in one of the RTFSs may perform vendor-specific fingerprinting operations that are different from those in other RTFSs, the use of an abstraction layer at a real-time event trigger infrastructure may enable a simplified implementation of an ACR system capable that supports multiple RTFSs with different vendor-specific technologies.

The processor module 460 may be operable to perform ACR or fingerprinting computations on a network television feed for audio and/or video fingerprinting. In this regard, the processor module 460 may be operable to handle frame-by-frame fingerprinting operations, for example. Moreover, the processor module 460 may be operable to handle network timing information for synchronizing the operation of the RTFS 450 with that of a network time protocol server such as the network time protocol server 170.

The processor module 460 may comprise at least one processing device 462. The processing device 462 may be a CPU, a DSP, and/or other type of integrated circuit or ASIC that may be utilized to perform data processing operations.

The memory module 470 may comprise suitable logic, circuitry, code, and/or interfaces that may be operable to store information utilized to enable the abstraction layer. The memory module 470 may be operable to store information generated in connection with fingerprinting computations.

The network module 480 may comprise suitable logic, circuitry, code, and/or interfaces that may be operable to allow the RTFS 450 to communicate with a corresponding one of the fingerprint match systems 130 or with a corresponding one of the fingerprint vendors 250, . . . , 256 described above. The network module 480 may also be operable to support communication between the RTFS 450 and a real-time event manager 400 (FIG. 4A). The network module 480 may support one or more communication protocols such as wireline protocols and/or wireless protocols.

Figure 5A:
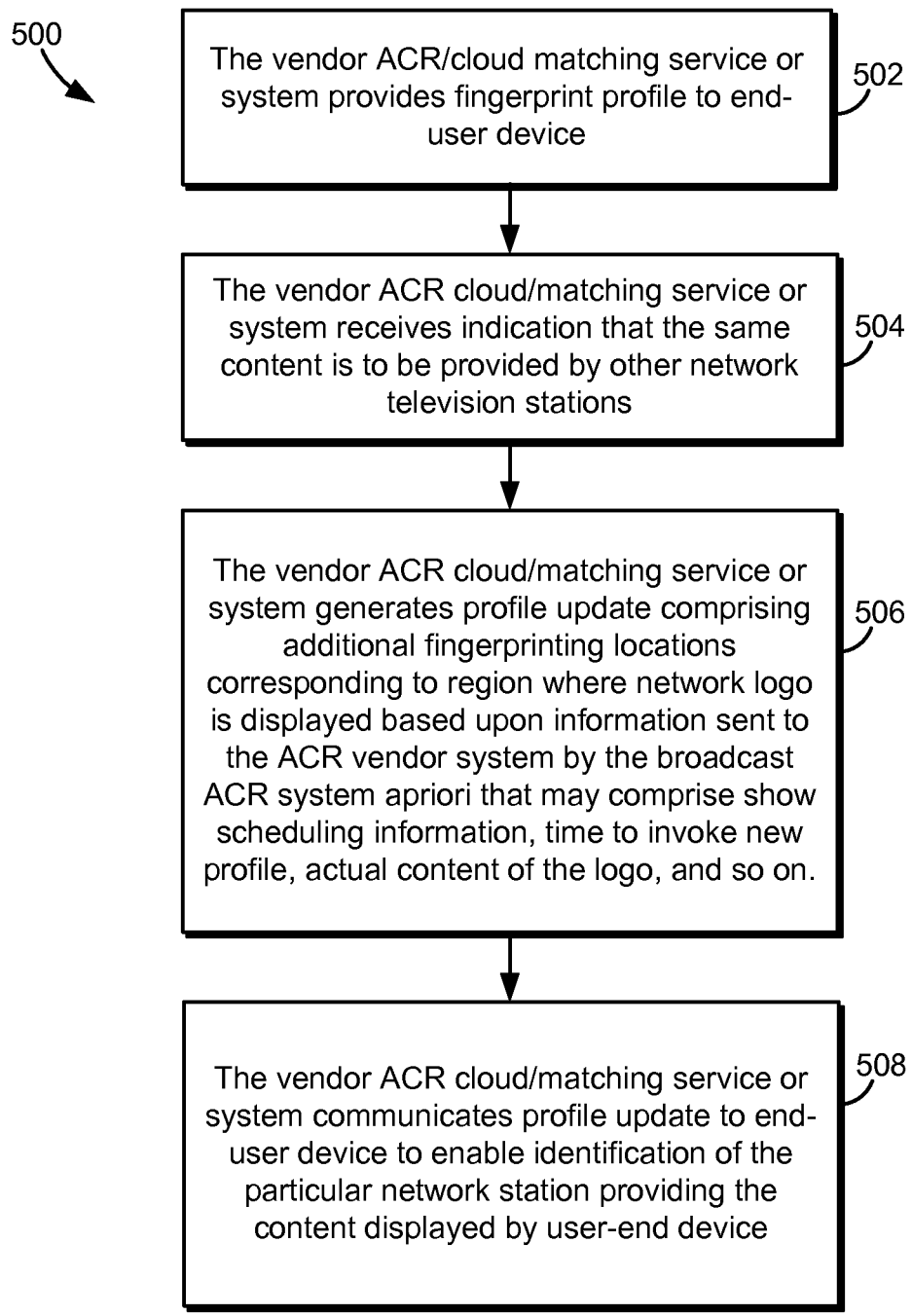
FIG. 5A is a flow diagram that illustrates exemplary steps for logo identification based on automatic content recognition, in accordance with various embodiments of the invention.

FIG. 5A is a flow diagram that illustrates exemplary steps for logo identification based on automatic content recognition, in accordance with various exemplary embodiments of the invention. Referring to FIG. 5A, there is shown a flow chart 500 comprising exemplary steps 502 through 508.

In step 502, an vendor ACR system such as the vendor ACR cloud/matching service or system 330 described above, may provide a fingerprint profile to an end-user device 320. In step 504, the vendor system such as the vendor ACR cloud/matching service or system 330 may receive an indication that the same content that is being provided to the end-user device is concurrently provided by other network television stations, such as, for example, the State of the Union address. This may occur via a plurality of concurrent matches of the same content or via a flag or other indicator in the schedule or program guide.

In step 506, the vendor system such as the vendor ACR cloud/matching service or system 330 may generate a new fingerprint profile or a fingerprint profile update that comprises additional fingerprinting locations that correspond to the region in a video frame where the logo or symbol of the network television station is typically displayed. This may be based upon information sent to the vendor ACR system, such as the vendor ACR cloud/matching service or system 330, by the broadcast ACR system 310 apriori that may comprise show or program scheduling information, a time to invoke new profile, an actual content of the logo, and so on. The location may be different based on the content. For example, for newscasts or other regular programming, the logo may be typically placed on the lower right-hand corner of the video frame. On the other hand, for a programming guide, the logo may be typically placed on the upper left-hand corner of the video frame. In some embodiments of the invention, the additional fingerprinting locations may correspond to more than one region, where each region is related to one of the typical placements of the logo or symbol of the network television station.

In step 508, the vendor ACR system such as the vendor ACR cloud/matching service or system 330 communicates the new fingerprint profile or fingerprint profile to the end-user device to enable identification of the particular network television station providing the content.

Figure 5B:
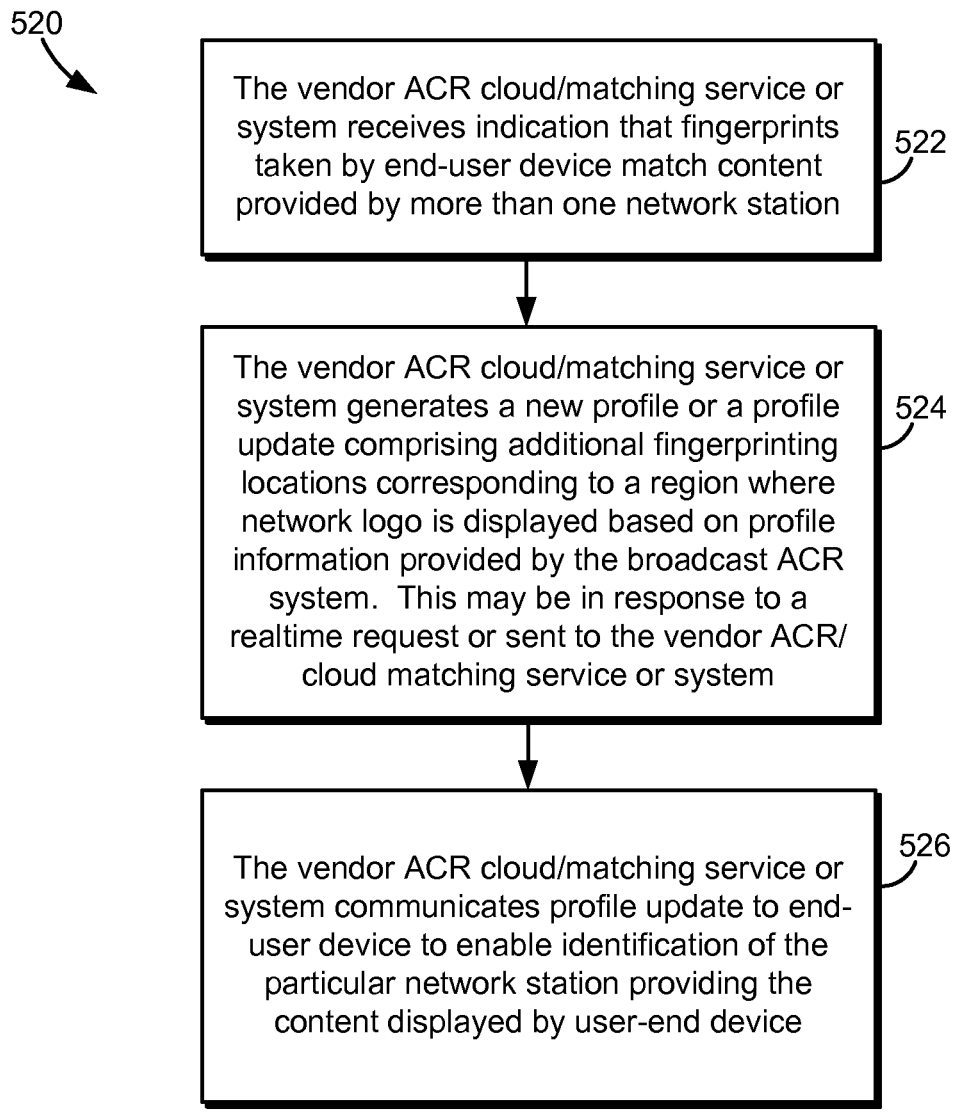
FIG. 5B is a flow diagram that illustrates exemplary steps for logo identification based on automatic content recognition, in accordance with various embodiments of the invention.

FIG. 5B is a flow diagram that illustrates exemplary steps for logo identification based on automatic content recognition, in accordance with various exemplary embodiments of the invention. Referring to FIG. 5B, there is shown a flow chart 520 comprising exemplary steps 522 through 526.

In step 522, a vendor ACR system such as the vendor ACR cloud/matching service or system 330 may receive an indication that the same content that is being provided to the end-user device is also provided by other network television stations. An example may occur when a program or show is syndicated and is available at the same time of day from multiple network television stations. The indication may result when, for example, fingerprints taken by the end-user device of the program or show result in multiple matches in a database.

At step 524, the vendor ACR system such as the vendor ACR cloud/matching service or system 330 may generate a new profile or a profile update comprising additional fingerprinting locations corresponding to a region where network logo is displayed based on profile information provided by the broadcast ACR system. This may be in response to a real-time request or sent to the vendor ACR/cloud matching service or system. In this regard, the vendor ACR cloud/matching service or system 330 may generate a new fingerprint profile or a fingerprint profile update that comprises additional fingerprinting locations that correspond to the region in a video frame where the logo or symbol of the network television station is typically displayed.

In step 526, the vendor ACR system such as the vendor ACR cloud/matching service or system 330 communicates the new fingerprint profile or fingerprint profile update to the end-user device to enable identification of the particular network television station providing the content displayed by the end-user device.

Figure 5C:
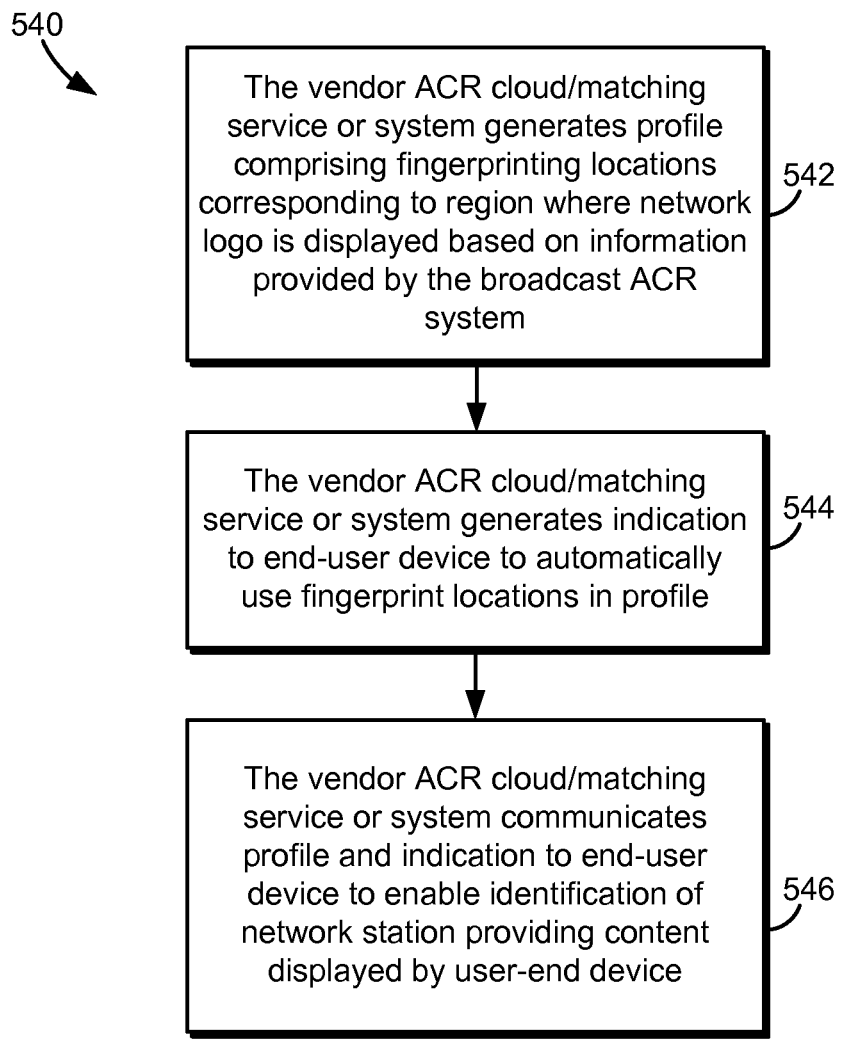
FIG. 5C is a flow diagram that illustrates exemplary steps for logo identification based on automatic content recognition, in accordance with various embodiments of the invention.

FIG. 5C a flow diagram that illustrates exemplary steps for logo identification based on automatic content recognition, in accordance with various exemplary embodiments of the invention. Referring to FIG. 5C, there is shown a flow chart 540 comprising exemplary steps 542 through 546.

In step 542, an vendor ACR system such as the vendor ACR cloud/matching service or system 330 described above, may generate a fingerprint profile for an end-user device. The fingerprint profile may comprise one or more fingerprinting locations that correspond to a region where the logo or symbol of the network television station associated with the ACR system is typically displayed based upon information that may be provided by the broadcast ACR system 310.

In step 544, the vendor ACR system such as the vendor ACR cloud/matching service or system 330 may generate an indication that the end-user device may automatically utilize the fingerprinting locations corresponding to the region where the logo is displayed when the network television station identity is not known or is unclear.

In step 546, the vendor ACR system such as the vendor ACR cloud/matching service or system 330 may communicate the fingerprint profile and the indication the end-user device to enable identification of the particular network television station providing the content. In some instances, the indication may be part of the fingerprint profile.

In an embodiment of the invention, a device in an broadcast ACR system such as the ACR system 100 or the broadcast ACR system (with abstraction layer) 310 may be operable to handle automatic content recognition operations and to generate one or more signals that provide instructions. The device may be an real-time event manager (e.g., real-time event manager 120), a RTFS (e.g., RTFSs 122, . . . , 124, RTFSs 240, . . . , 244), and/or some other portion of an ACR system, for example. The instructions may comprise instructions to determine one or more locations in a video frame to take fingerprints. The one or more locations may correspond to a pre-determined or dynamically determined portion of the video frame in which a graphical item that represents a network television station may be displayed. The graphical item may comprise one or more of a logo, a symbol, a sign, a watermark, and text that represent the network television station.

The instructions may comprise instructions to generate a profile (e.g., fingerprint profile) comprising the determined one or more locations. The instructions may also comprise instructions to send the generated profile for communication to an end-user device, wherein the end-user device is operable to utilize the profile to take fingerprints of content provided by the network television station. An example of such an end-user device is one of the end-user devices 140 in FIG. 1, one of the end-user devices 260, . . . , 264 in FIGS. 2A and 2B, and the end-user device 320 in FIGS. 3A and 3B.

The signals generated by the broadcast ACR system 310 may also provide instructions to generate an indication that the determined one or more locations are to be automatically utilized by the end-user device to take fingerprints when one or more fingerprints previously taken by the end-user device match fingerprints that correspond to content provided by the network television station. The instructions may also provide that the generated indication be sent for communication to the end-user device.

In another aspect of the invention, the device may be operable to receive an indication that one or more fingerprints previously taken by the end-user device match fingerprints that correspond to content provided by the network television station and, in response to the received indication, the generated one or more signals may provide instructions to a portion of the vendor ACR system such as the vendor ACR cloud/matching service or system 330 to generate the profile. In general, the vendor ACR system such as the vendor ACR cloud/matching service or system 330 is operable to issue profile instructions.

In another aspect of the invention, the broadcast ACR system 310 may be operable to generate one or more additional signals that provide instructions. These instructions may comprise instructions to generate additional profiles at a pre-determined rate. The pre-determined rate may be approximately one profile every five seconds or to keep a given profile active until further notice. Each additional profile may comprise one or more locations in a video frame to take fingerprints. The one or more locations of each additional profile may correspond to a pre-determined or dynamically determined portion of the video frame in which a graphical item that represents the network television station is displayed. These instructions may also comprise instructions to send the generated additional profiles for communication to the end-user device.

In another aspect of the invention, the device may be operable to receive an indication that the content provided by the network television station is provided concurrently by other network television stations and, in response to the received indication, the generated one or more signals may provide instructions to a portion of the ACR system to generate the profile. The indication may be provided by, for example, the network television station operations 300 shown in FIGS. 3A and 3B.

In another aspect of the invention, the broadcast ACR system 310 may be operable to receive an indication that one or more fingerprints previously taken by the end-user device match fingerprints that correspond to content provided by the network television station and also match content provided by one or more additional network television stations. In this scenario, the vendor ACR system such as the vendor ACR cloud/matching service or system 330 may be operable to query the Broadcast ACR system in real time to retrieve a updated fingerprint profile. The updated profile which may comprise information regarding location of specific logos, pointers to the logo itself (as a file), and various other instructions (time to invoke, auto invoke, etc) is sent to the ACR vendor's control server. The ACR vendor's control server sends the updated profile to the TV and/or end user device. In another embodiment of the invention, the broadcast ACR system 310 may be operable to send the enhanced profile information in advance of potential multi-matches and permit the vendor ACR system such as the vendor ACR cloud/matching service or system 330 to automatically invoke the profiles as necessary upon detection of multi-matches against networks which enhanced fingerprint profiles exist. In response to the received indication, the one or more signals generate by the device may provide instructions to a portion of the ACR system to generate the profile.

With respect to the various aspects of the invention described above, the profile may comprise a plurality of locations in the video frame to take fingerprints that correspond to a portion of the video frame that is different from the pre-determined portion of the video frame in which the graphical item is displayed. The plurality of locations could comprise from about 16 locations to about 36 locations or possibly more.

Figure 6:
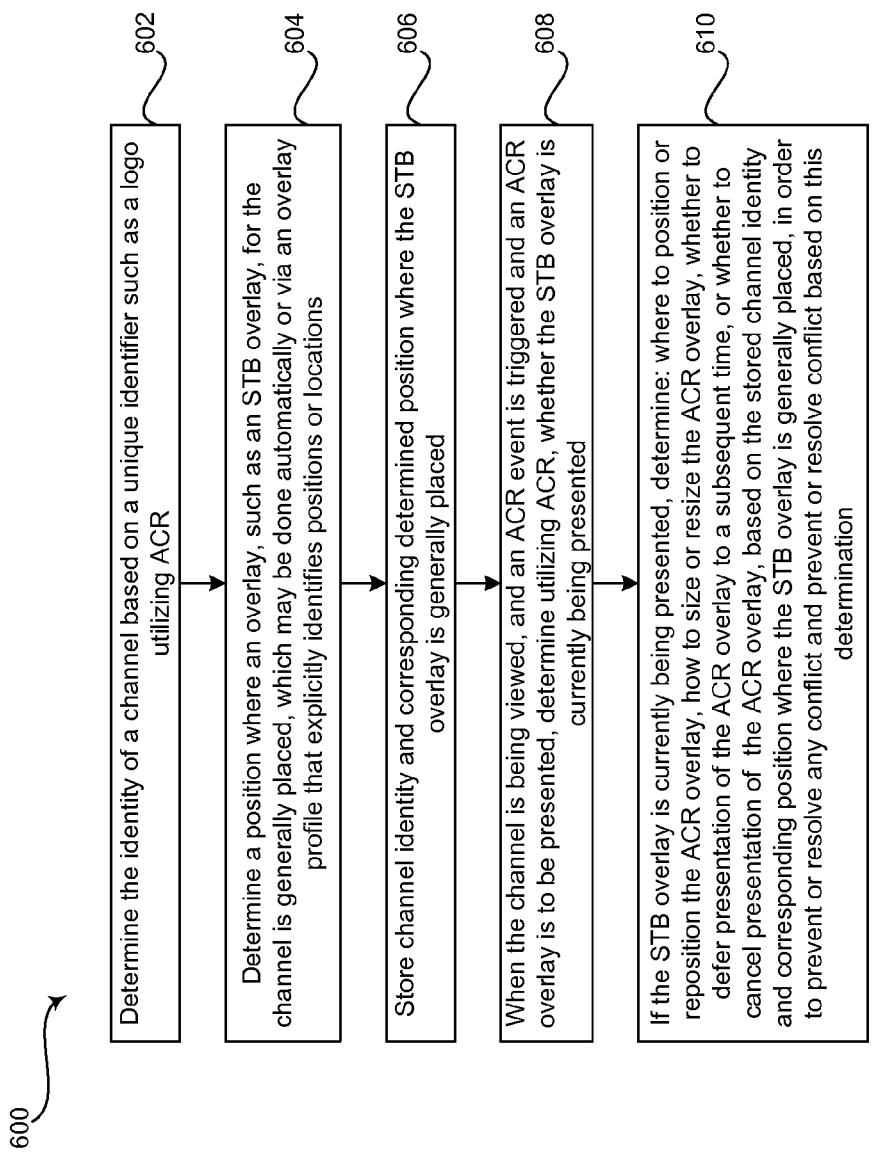
FIG. 6 is a flow chart illustrating exemplary steps for detecting and resolving overlay conflicts in an automatic content recognition based system, in accordance with an exemplary embodiment of the invention.

FIG. 6 is a flow chart illustrating exemplary steps for detecting and resolving overlay conflicts in an automatic content recognition based system, in accordance with an exemplary embodiment of the invention. Referring to FIG. 6, is shown a flow chart 600 comprising exemplary steps 602 through 610.

In step 602, the identity of a channel may be determined based on a unique identifier such as a logo utilizing ACR. In step 604, a position where an overlay, such as an STB overlay, for the channel is generally placed may be determined automatically or via an overlay profile that may explicitly identify positions or locations. In step 606, the channel identity and corresponding determined position where the STB overlay is generally placed may be stored. In step 608, when the channel is being viewed, and an ACR event is triggered and an ACR overlay is to be presented, ACR may be utilized to determine whether the STB overlay is currently being presented. In step 610, if the STB overlay is currently being presented, determine: where to position or reposition the ACR overlay, how to size or resize the ACR overlay, whether to defer presentation of the ACR overlay to a subsequent time, or whether to cancel presentation of the ACR overlay, based on the stored channel identity and corresponding position where the STB overlay is generally placed, in order to prevent or resolve any conflict and prevent or resolve conflict based on this determination.

Figure 7:
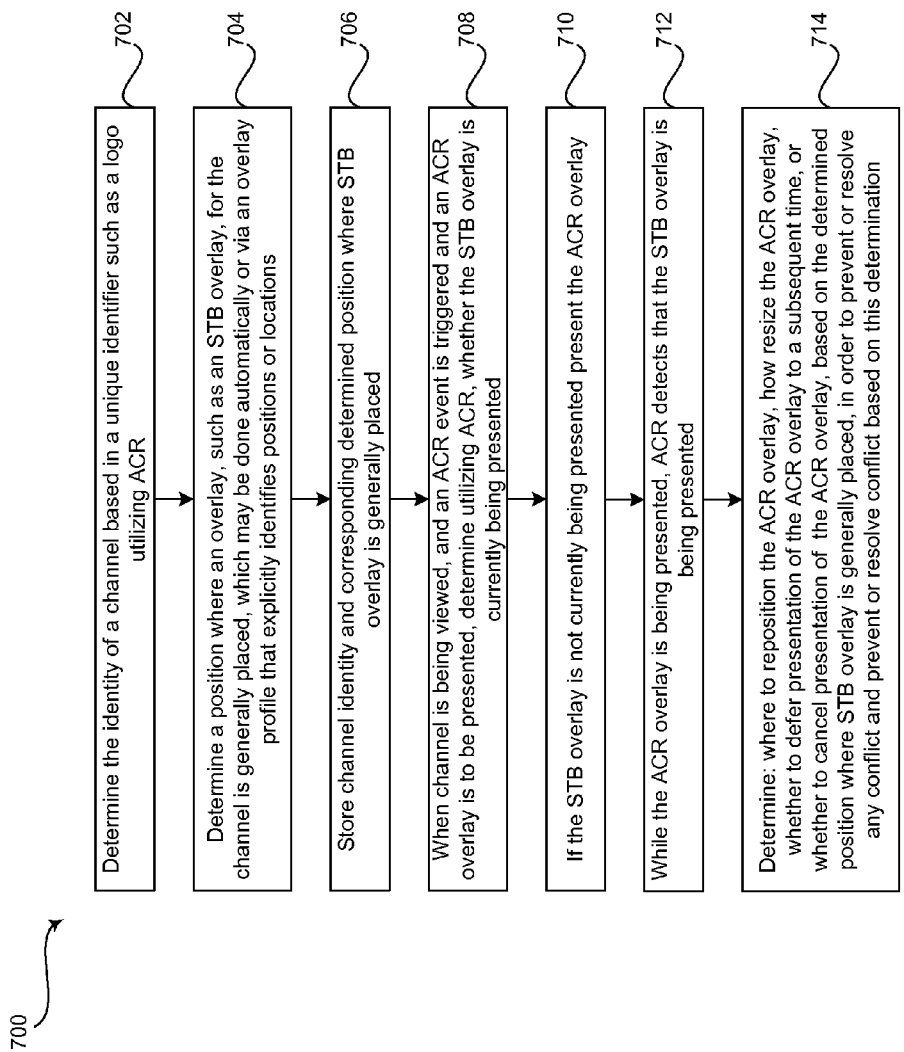
FIG. 7 is a flow chart illustrating exemplary steps for detecting and resolving overlay conflicts in an automatic con-

FIG. 7 is a flow chart illustrating exemplary steps for detecting and resolving overlay conflicts in an automatic content recognition based system, in accordance with an exemplary embodiment of the invention. Referring to FIG. 7, is shown in a flow chart 700 comprising exemplary steps 702 through 714.

In step 702, the identity of a channel may be determined based on a unique identifier such as a logo utilizing ACR. In step 704, a position where an overlay, such as an STB overlay, for the channel is generally placed may be determined automatically or via an overlay profile that may explicitly identify positions or locations. In step 706, the channel identity and corresponding determined position where STB overlay is generally placed may be stored. In step 708, when the channel is being viewed, and an ACR event is triggered and an ACR overlay is to be presented, determine utilizing ACR, whether the STB overlay is currently being presented. In step 710, if the STB overlay is not currently being presented, the ACR overlay may be presented. In step 712, while the ACR overlay is being presented, ACR detects that the STB overlay is being presented. In other words STB overlay was presented after the ACR overlay was presented. In step 714, it may be determined: where to reposition the ACR overlay, how to resize the ACR overlay, whether to defer presentation of the ACR overlay to a subsequent time, or whether to cancel presentation of the ACR overlay, based on the determined position where the STB overlay is generally placed, in order to prevent or resolve any conflict and prevent or resolve conflict based on this determination.

In various exemplary embodiments of the invention, a method and system, for providing graphical item (e.g. channel logo) identification based on automatic content recognition. In this regard, a device that is operable to handle automatic content recognition operations may be operable to generate one or more signals that provide instructions to determine one or more locations in a video frame to take fingerprints. The one or more locations correspond to a determined portion of the video frame in which a graphical item that represents a network television station is displayed. The generated one or more signals may provide instructions to generate a profile comprising the determined one or more locations, and to send the generated profile for communication to an end-user device, wherein the end-user device is operable to utilize the profile to take fingerprints of content provided by the network television station. The graphical item may comprise one or more of a channel logo, a symbol, a sign, a mark, an object, a watermark, and text that represent the network television station.

The generated one or more signals may also provide instructions to generate an indication that the determined one or more locations are to be automatically utilized by the end-user device to take fingerprints when one or more fingerprints previously taken by the end-user device match fingerprints that correspond to content provided by the network television station. The generated one or more signals may also provide instructions to send the generated indication for communication to the end-user device.

The device may also be operable to receive an indication that one or more fingerprints previously taken by the end-user device match fingerprints that correspond to content provided by the network television station. In response to the received indication, the generated one or more signals provide instructions to generate the profile. The device is operable to generate one or more additional signals that provide instructions to generate additional profiles at a determined rate, wherein each additional profile comprises one or more locations in a video frame to take fingerprints. The one or more locations of each additional profile corresponds to a determined portion of the video frame in which a graphical item that represents the network television station is displayed. The generated additional profiles for communication maybe sent to the end-user device.

An exemplary determined rate is approximately one profile every five seconds. Other rates, whether lesser or greater may also be utilized without departing from the spirit and scope of the invention.

The device may also be operable to receive an indication that the content provided by the network television station is provided concurrently by other network television stations. In response to the received indication, the generated one or more signals provide instructions to generate the profile. The device may receive an indication that one or more fingerprints previously taken by the end-user device match fingerprints that correspond to content provided by the network television station and also match content provided by one or more additional network television stations. In response to the received indication, the generated one or more signals provide instructions to generate the profile. The profile may comprise a plurality of locations in the video frame to take fingerprints that correspond to a portion of the video frame that is different from the determined portion of the video frame in which the graphical item is displayed.

Another embodiment of the invention may comprise a server or computer system that is operable receive an indication that one or more fingerprints previously taken by an end-user device match fingerprints that correspond to content provided by a network television station. In response to the received indication, one or more instructions may be generated to generate a profile comprising one or more locations in a video frame that correspond to a determined portion of the video frame in which a graphical item that represents the network television station is displayed. One or more instructions may also be generated to send the generated profile for communication to the end-user device, wherein the end-user device is operable to utilize the profile to take fingerprints of content provided by the network television station.

In various embodiment of the invention, a device that is operable to handle operations for automatic content recognition is operable to detect utilizing the automatic content recognition operations, a conflict that occurs on a channel when a first overlay and a second overlay are concurrently displayed on the device. The device may be operable to control and/or modify the presentation of the first overlay and/or the second overlay for the channel based on the detection in order to resolve the conflict. The device may be operable to utilize the automatic content recognition operations to determine an identity of the channel based on a unique identifier that is associated with the channel and is presented on the channel. The unique identifier of the channel may comprise a channel logo, a sign, a watermark, text, animation, or the content itself. The unique identifier may comprise a graphical item.

The device may be operable to utilize the automatic content recognition operations to determine a location where the first overlay and/or the second overlay is presented for the channel based on the determined identity of the channel. If the conflict is detected, the device is operable to utilize the automatic content recognition operations to determine one or more corresponding new locations for presenting the first overlay and/or the second overlay for the channel in order to resolve the conflict. The one or more corresponding new locations may be based upon a region constraint map for a particular channel. In instances when the conflict is detected, the device may be operable to relocate the first overlay and/or the second overlay from the determined location where the first overlay and the second overlay is presented to one or more corresponding new locations.

The device may also be operable to utilize the automatic content recognition operations to determine a corresponding size of the first overlay and/or the second overlay for the channel. If the conflict is detected, the device is operable to determine a new size of the first overlay and/or the second overlay for the channel in order to resolve the conflict. In instances where the conflict is detected, the device is operable to resize the first overlay and/or the second overlay for the channel based on the determined new size.

In an embodiment of the invention, the device may be operable to defer presentation of one of the first overlay and the second overlay for the channel whenever the conflict is detected. In this regard, the device may defer presentation and present the one of the first overlay and the second overlay at a subsequent time. In another embodiment of the invention, the device may be operable to cancel presentation of one of the first overlay and the second overlay for the channel whenever the conflict is detected.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for detecting and resolving overlay conflicts in an automatic content recognition based system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a device that is operable to handle operations for automatic content recognition, wherein said device handles said operations for automatic content recognition by communicating with an automatic content recognition system that assigns same interactive event identifiers to different sets of video fingerprints generated from same video content segments by different video fingerprint technologies based on timing of said assignment of said interactive event identifiers to said different sets of video fingerprints:
   detecting utilizing said automatic content recognition operations, a conflict on a channel with concurrent presentation of a first overlay and a second overlay on said device; and
   modifying said presentation of at least one of said first overlay and said second overlay for said channel based on said detection.

2. The method according to claim 1, comprising determining utilizing said automatic content recognition operations, an identity of said channel based on a unique identifier that is associated with said channel and is presented on said channel.

3. The method according to claim 2, comprising determining utilizing said automatic content recognition operations, a location where one or both of said first overlay and said second overlay is presented for said channel based on said determined identity of said channel.

4. The method according to claim 3, comprising, if said conflict is detected, determining one or more corresponding new locations for presenting said one or both of said first overlay and said second overlay for said channel to resolve said conflict.

5. The method according to claim 4, comprising, if said conflict is detected, relocating said one or both of said first overlay and said second overlay from said determined location where said one or both of said first overlay and said second overlay is presented to said one or more corresponding new locations, wherein said one or more corresponding new locations are based upon a region constraint map for a particular channel.

6. The method according to claim 2, comprising determining utilizing said automatic content recognition operations, a corresponding size of one or both of said first overlay and said second overlay for said channel.

7. The method according to claim 6, comprising, if said conflict is detected, determining a new size of one or both of said first overlay and said second overlay for said channel to resolve said conflict.

8. The method according to claim 7, comprising, if said conflict is detected, resizing said one or both of said first overlay and said second overlay for said channel based on said determined new size.

9. The method according to claim 1, comprising, if said conflict is detected, deferring presentation of one of said first overlay and said second overlay for said channel.

10. The method according to claim 1, comprising, if said conflict is detected, canceling presentation of one of said first overlay and said second overlay for said channel.

11. A system, comprising:
    a device that is operable to handle operations for automatic content recognition, wherein said device handles said operations for automatic content recognition by communicating with an automatic content recognition system that assigns same interactive event identifiers to different sets of video fingerprints generated from same video content segments by different video fingerprint technologies based on timing of said assignment of said interactive event identifiers to said different sets of video fingerprints, said device being operable to:
    detect utilizing said automatic content recognition operations, a conflict on a channel with concurrent presentation of a first overlay and a second overlay on said device; and
    modify said presentation of at least one of said first overlay and said second overlay for said channel based on said detection.

12. The system according to claim 11, wherein said device is operable to utilize said automatic content recognition operations to determine an identity of said channel based on a unique identifier that is associated with said channel and is presented on said channel.

13. The system according to claim 12, wherein said device is operable to utilize said automatic content recognition operations to determine a location where one or both of said first overlay and said second overlay is presented for said channel based on said determined identity of said channel.

14. The system according to claim 13, wherein, if said conflict is detected, said device is operable to utilize said automatic content recognition operations to determine one or more corresponding new locations for presenting said one or both of said first overlay and said second overlay for said channel to resolve said conflict.

15. The system according to claim 14, wherein, if said conflict is detected, said device is operable to relocate said one or both of said first overlay and said second overlay from said determined location where said one or both of said first overlay and said second overlay is presented to said one or more corresponding new locations, wherein said one or more corresponding new locations are based upon a region constraint map for a particular channel.

16. The system according to claim 12, wherein said device is operable to utilize said automatic content recognition operations to determine a corresponding size of one or both of said first overlay and said second overlay for said channel.

17. The system according to claim 16, wherein, if said conflict is detected, said device is operable to determine a new size of one or both of said first overlay and said second overlay for said channel to resolve said conflict.

18. The system according to claim 17, wherein, if said conflict is detected, said device is operable to resize said one or both of said first overlay and said second overlay for said channel based on said determined new size.

19. The system according to claim 11, wherein:

if said conflict is detected, said device is operable to defer presentation of one of said first overlay and said second overlay for said channel; and if said conflict is detected, said device is operable to cancel presentation of one of said first overlay and said second overlay for said channel.

20. A non-transitory computer readable medium having stored thereon, a computer program having at least one code section being executable by a machine for causing the machine to perform steps comprising:

in a device that is operable to handle operations for automatic content recognition, wherein said device handles said operations for automatic content recognition by communicating with an automatic content recognition system that assigns same interactive event identifiers to different sets of video fingerprints generated from same video content segments by different video fingerprint technologies based on timing of said assignment of said interactive event identifiers to said different sets of video fingerprints, said at least one code section causing:

detecting utilizing said automatic content recognition operations, a conflict on a channel with concurrent presentation of a first overlay and a second overlay on said device; and modifying said presentation of at least one of said first overlay and said second overlay for said channel based on said detection.

* * * * *